US011545845B2

(12) United States Patent
Gall et al.

(10) Patent No.: US 11,545,845 B2
(45) Date of Patent: Jan. 3, 2023

(54) SINGLE CELL BATTERY CHARGER

(71) Applicant: MILWAUKEE ELECTRIC TOOL CORPORATION, Brookfield, WI (US)

(72) Inventors: Benjamin Gall, Wauwatosa, WI (US); Jason R. Crowe, Wauwatosa, WI (US); Josh Adams, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 645 days.

(21) Appl. No.: 15/939,765

(22) Filed: Mar. 29, 2018

(65) Prior Publication Data
US 2018/0287400 A1 Oct. 4, 2018

Related U.S. Application Data

(60) Provisional application No. 62/478,480, filed on Mar. 29, 2017.

(51) Int. Cl.
*H02J 7/00* (2006.01)

(52) U.S. Cl.
CPC ............. *H02J 7/0042* (2013.01); *H02J 7/00* (2013.01)

(58) Field of Classification Search
CPC ................................................ H02J 7/0034
USPC ........................................................ 320/113
See application file for complete search history.

(56) References Cited

U.S. PATENT DOCUMENTS

| | | | |
|---|---|---|---|
| 4,880,712 A | 11/1989 | Gordecki | |
| 6,741,065 B1* | 5/2004 | Ishii | H02J 7/0024 320/122 |
| 8,896,268 B2* | 11/2014 | Sakurai | H02H 3/08 320/132 |
| 10,283,817 B2* | 5/2019 | Barnett | H01M 10/0525 |
| 2004/0229113 A1 | 11/2004 | Sharpe et al. | |
| 2005/0151507 A1 | 7/2005 | Smith | |
| 2005/0276042 A1* | 12/2005 | Ho | F21V 15/01 362/205 |
| 2006/0267547 A1* | 11/2006 | Godovich | H01M 10/0445 320/107 |

(Continued)

FOREIGN PATENT DOCUMENTS

| | | |
|---|---|---|
| DE | 202006004920 U1 | 6/2006 |
| GB | 2539551 A | 12/2016 |
| WO | 2007135199 | 11/2007 |

OTHER PUBLICATIONS

International Search Report with Written Opinion for related Application No. PCT/US2018/025093 dated Jul. 16, 2018 (11 pages).

(Continued)

*Primary Examiner* — Yalkew Fantu
(74) *Attorney, Agent, or Firm* — Michael Best & Friedrich LLP

(57) ABSTRACT

A battery charger and a method of charging a battery pack. The battery charger may generally include a housing defining an opening, a tray defining a receptacle operable to receive a battery pack, the tray being movable through the opening between an open position, in which the receptacle is accessible, and a closed position, in which the receptacle is closed, and a locking member movable relative to the housing between an unlocked position, in which the tray is movable between the open position and the closed position, and a locked position, in which the tray is retained in the closed position.

16 Claims, 26 Drawing Sheets

(56) References Cited

U.S. PATENT DOCUMENTS

| | | | |
|---|---|---|---|
| 2015/0271873 A1* | 9/2015 | Gray | H05B 1/0272 |
| | | | 219/211 |
| 2016/0093926 A1* | 3/2016 | Wright | H01M 10/46 |
| | | | 320/162 |
| 2016/0134144 A1 | 5/2016 | Miller et al. | |
| 2016/0241051 A1* | 8/2016 | Yang | H01M 10/44 |
| 2016/0248123 A1* | 8/2016 | Barnett | H01M 50/107 |

OTHER PUBLICATIONS

Extended European Search Report for Application No. 18778326.1 dated Nov. 5, 2020 (10 pages).

* cited by examiner

SINGLE CELL BATTERY CHARGER

RELATED APPLICATION

The present application claims priority to U.S. Provisional Patent Application No. 62/478,480, filed Mar. 29, 2017, the entire contents of which are hereby incorporated by reference.

FIELD

The present invention relates to battery chargers and, more particularly, to a charger for a single cell battery pack.

SUMMARY

In one independent aspect, a battery charger may generally include a housing defining an opening, a tray defining a receptacle operable to receive a battery pack, the tray being movable through the opening between an open position, in which the receptacle is accessible, and a closed position, in which the receptacle is closed, and a locking member movable (e.g., pivotable) relative to the housing between an unlocked position, in which the tray is movable between the open position and the closed position, and a locked position, in which the tray is retained in the closed position.

In some constructions, the locking member is supported on the tray, the tray being pivotable relative to the housing to move the locking member between the unlocked position and the locked position. The tray may be pivotable about 90 degrees between the unlocked position and the locked position.

In some constructions, a projection is supported on one of the housing and the locking member, and a recess is defined by the other of the housing and the locking member, the projection being engageable in the recess to lock the tray in the closed position. The recess may include an annular groove, the projection being engageable in the annular groove to lock the tray in the closed position. The recess may include an axial groove communicating with the annular groove, the projection being receivable through the axial groove and into the annular groove.

In another independent aspect, a battery charger may generally include a housing defining a cavity; a tray defining a receptacle and receivable within the cavity, the receptacle being operable to receive a battery pack, the tray being movable relative to the housing between a closed position, in which the receptacle is closed, and an open position, in which the receptacle is accessible; and a user interface coupled to the tray and operable to pivot the tray between a locked position, in which the tray is fixed relative to the housing, and an unlocked position, in which the tray is movable between the open position and the closed position.

In yet another independent aspect, a method of charging a battery pack may be provided. The method may generally include opening a receptacle defined by a tray; inserting a battery pack into the receptacle; moving the tray into a housing to close the receptacle; after moving, pivoting a locking member relative to the housing to lock the tray in a closed position; and charging the battery pack.

In a further independent aspect, a battery charger may generally include a housing defining a cavity and an opening communicating into the cavity, the housing including a first locking member; a tray defining a receptacle operable to receive a battery pack, the tray being slidable relative to the housing through the opening between a closed position, in which the tray is positioned within the cavity and the receptacle is closed, and an open position, in which the tray is disposed at least partially out of the cavity and is accessible to receive the battery pack, the tray including a second locking member; a user interface coupled to the tray and operable to pivot the tray between a locked position, in which the first locking member engages the second locking member to retain the tray in the closed position, and an unlocked position, in which the first locking member is disengaged from the second locking member such that the tray is slidable between the closed position and the open position.

In another independent aspect, a battery charger may generally include a housing defining a cavity and an opening communicating into the cavity; a tray defining a receptacle operable to receive a battery pack, the tray being movable relative to the housing through the opening between an open position, in which the receptacle is accessible, and a closed position, in which the receptacle is closed; and a stop coupled to the one of the tray and the housing and engageable with the other of the tray and the housing to limit movement of the tray from the cavity and through the opening.

In yet another independent aspect, a method of charging a battery pack may be provided. The method may generally include moving a tray defining a receptacle in a first direction relative to a housing to open the receptacle; inserting a battery pack into the receptacle; moving the tray in a second direction relative to the housing to close the receptacle, the second direction being opposite the first direction; moving the tray in a third direction relative to the housing to lock the tray to the housing; and charging the battery pack.

In a further independent aspect, an electrical combination may generally include a battery pack including a pack housing, and a battery cell supported by the pack housing; and a battery charger including a charger housing defining an opening, a tray defining a receptacle operable to receive the battery pack, the tray being movable through the opening relative to the charger housing between an open position, in which the receptacle is accessible, and a closed position, in which the receptacle is closed, and a locking member pivotable relative to the charger housing between an unlocked position, in which the tray is movable between the open position and the closed position, and an locked position, in which the tray is retained in the closed position.

In another independent aspect, battery charger may generally include a housing defining an opening; a tray defining a receptacle operable to receive a battery pack, the tray being movable through the opening between an open position, in which the receptacle is accessible, and a closed position, in which the receptacle is closed; a locking member movable between an unlocked position, in which the tray is movable between the open position and the closed position, and a locked position, in which the tray is retained in the closed position; and a detent arrangement engageable when the locking member is in one of the unlocked position and the locked position to retain the locking member in the one of the unlocked position and the locked position.

Other independent features and independent aspects of the invention may become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

In addition, it should be understood that embodiments of the invention may include hardware, software, and electronic components or modules that, for purposes of discussion, may be illustrated and described as if the majority of the components were implemented solely in hardware. However, based on a reading of the detailed description, it should be recognized that, in at least one embodiment, electronic-based aspects of the invention may be implemented in software (e.g., instructions stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Figure 21:
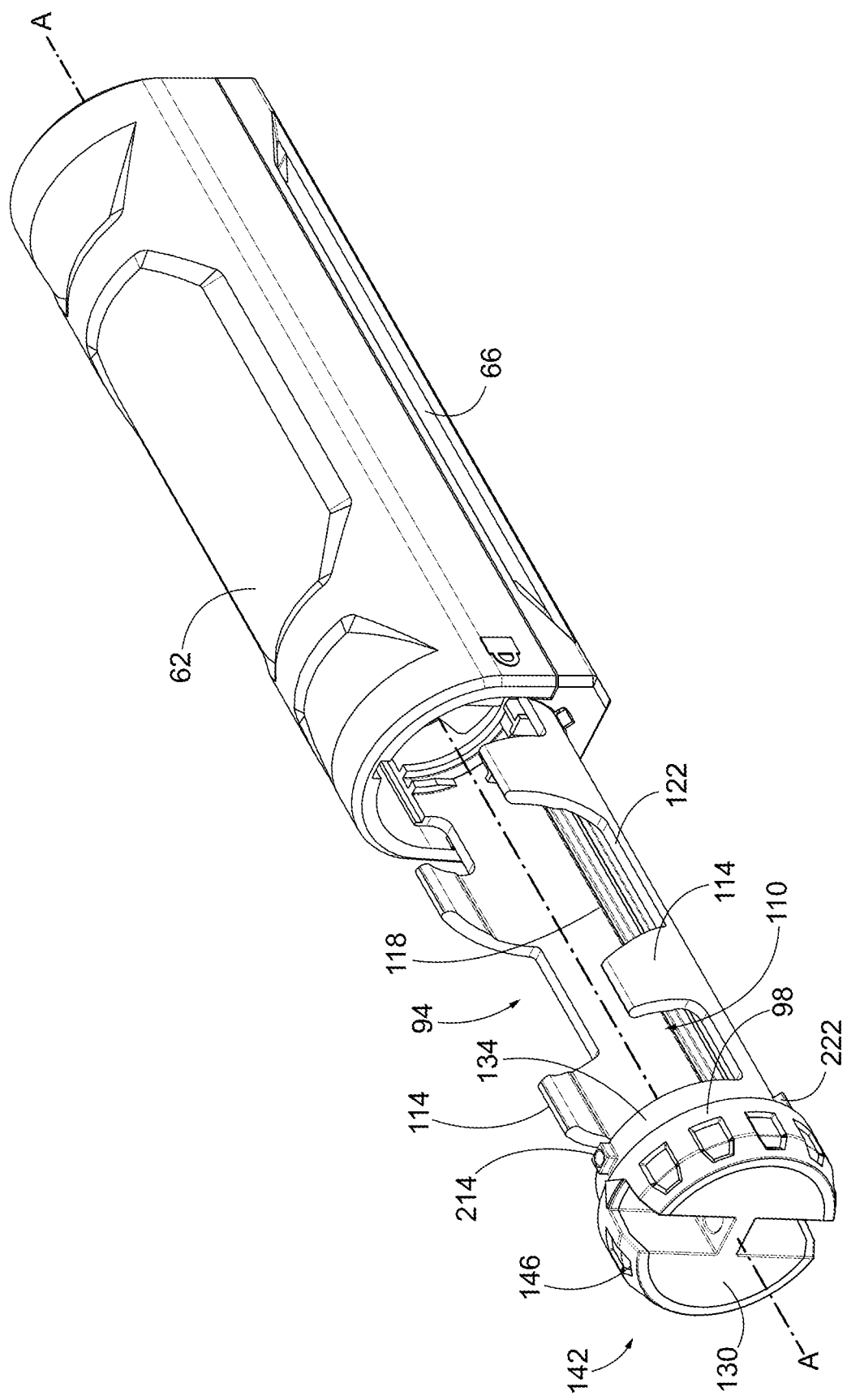
FIG. 21 is a perspective view of the battery charger in an open, unlocked configuration.
Figure 22:
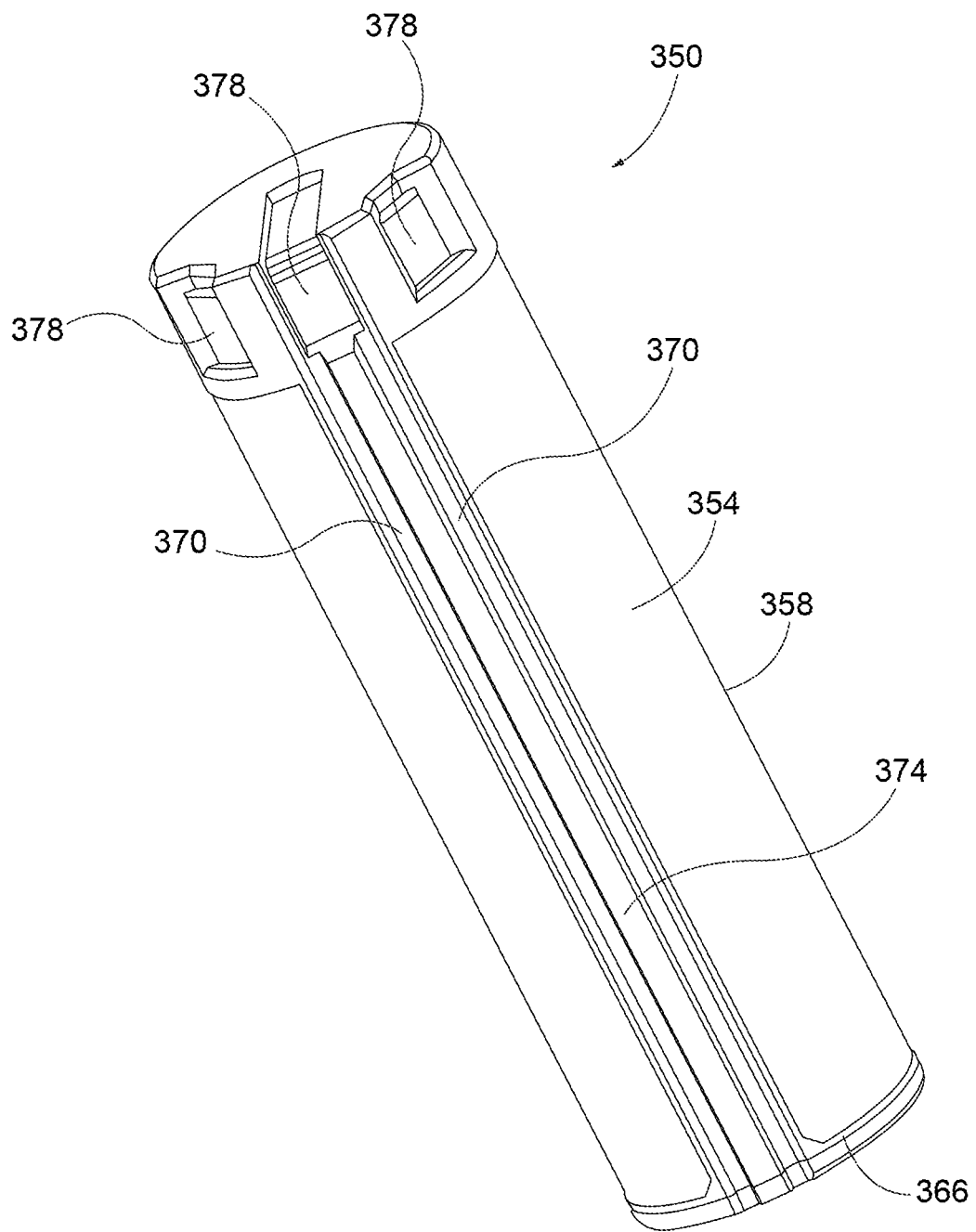
FIG. 22 is a perspective view of an exemplary battery pack for use with the battery charger shown in FIGS. 1-21.

FIGS. 1-21 and 23-26 illustrate a battery charger 50 for receiving and charging a battery pack 350 (see FIG. 22; e.g., a lithium ion power tool battery pack, a 4V single cell lithium ion battery pack, etc.). The charger 50 generally provides a movable and lockable receptacle for the battery pack 350. In the illustrated construction, the battery pack receptacle is slidable between open and closed positions and a twisting or pivoting motion activates the locking arrangement.

The charger 50 includes a tray 54 movably (e.g., slidably) engaged with a housing 58. In the illustrated construction, the tray 54 is movable between an open or battery receiving configuration, a closed, unlocked configuration, and a closed, locked configuration. As will be described in detail below, the battery pack 350 is received by the tray 54 in the open configuration, and the tray 54 is subsequently slid into the housing 58 to reach the closed, unlocked configuration. The charger 40 (e.g., the tray 54) is then adjusted into the closed, locked configuration in which a battery charging operation may be conducted.

Figure 1:
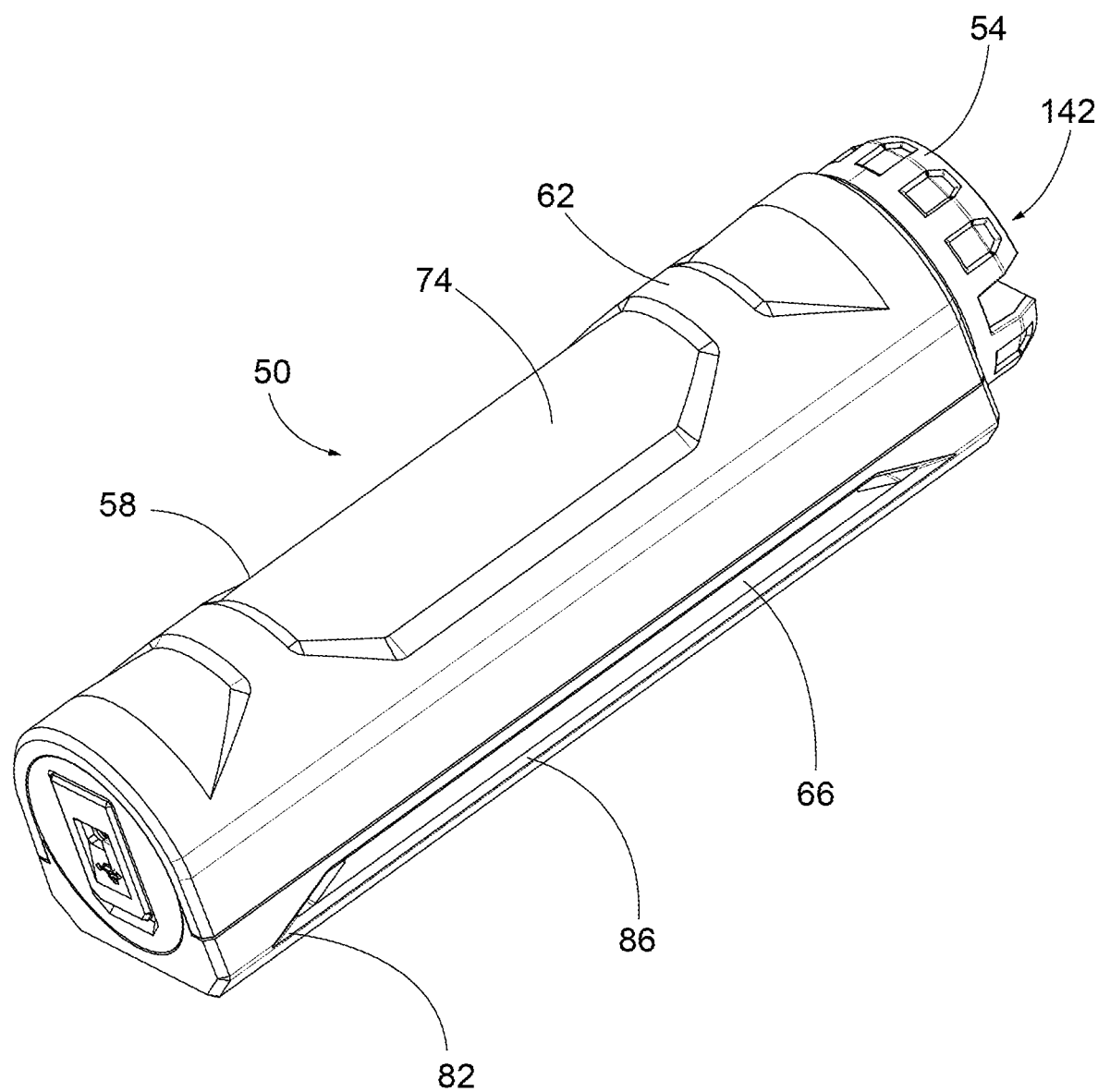
FIG. 1 is a perspective view of a battery charger.
Figure 2:
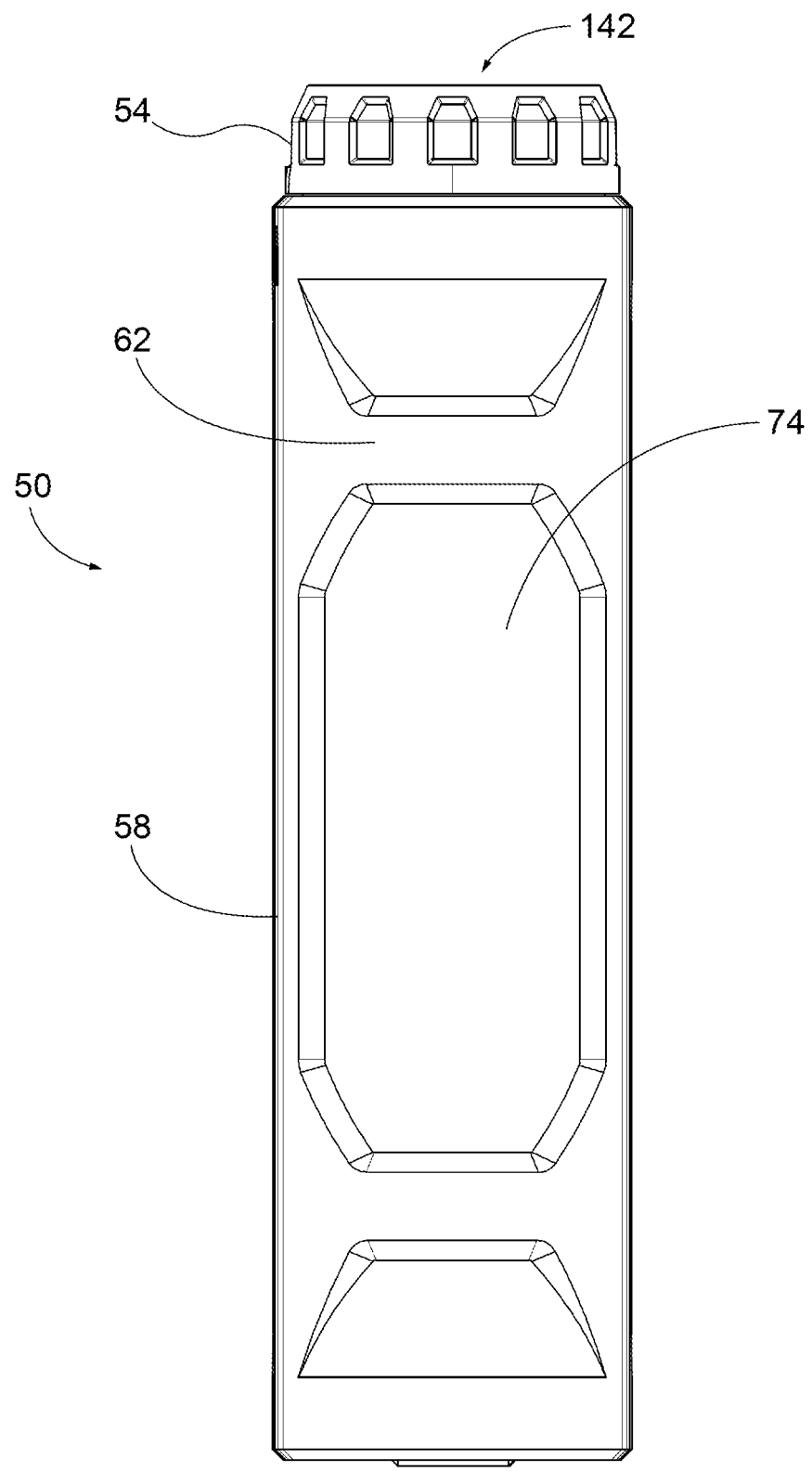
FIG. 2 is a top view of the battery charger shown in FIG. 1.
Figure 3:
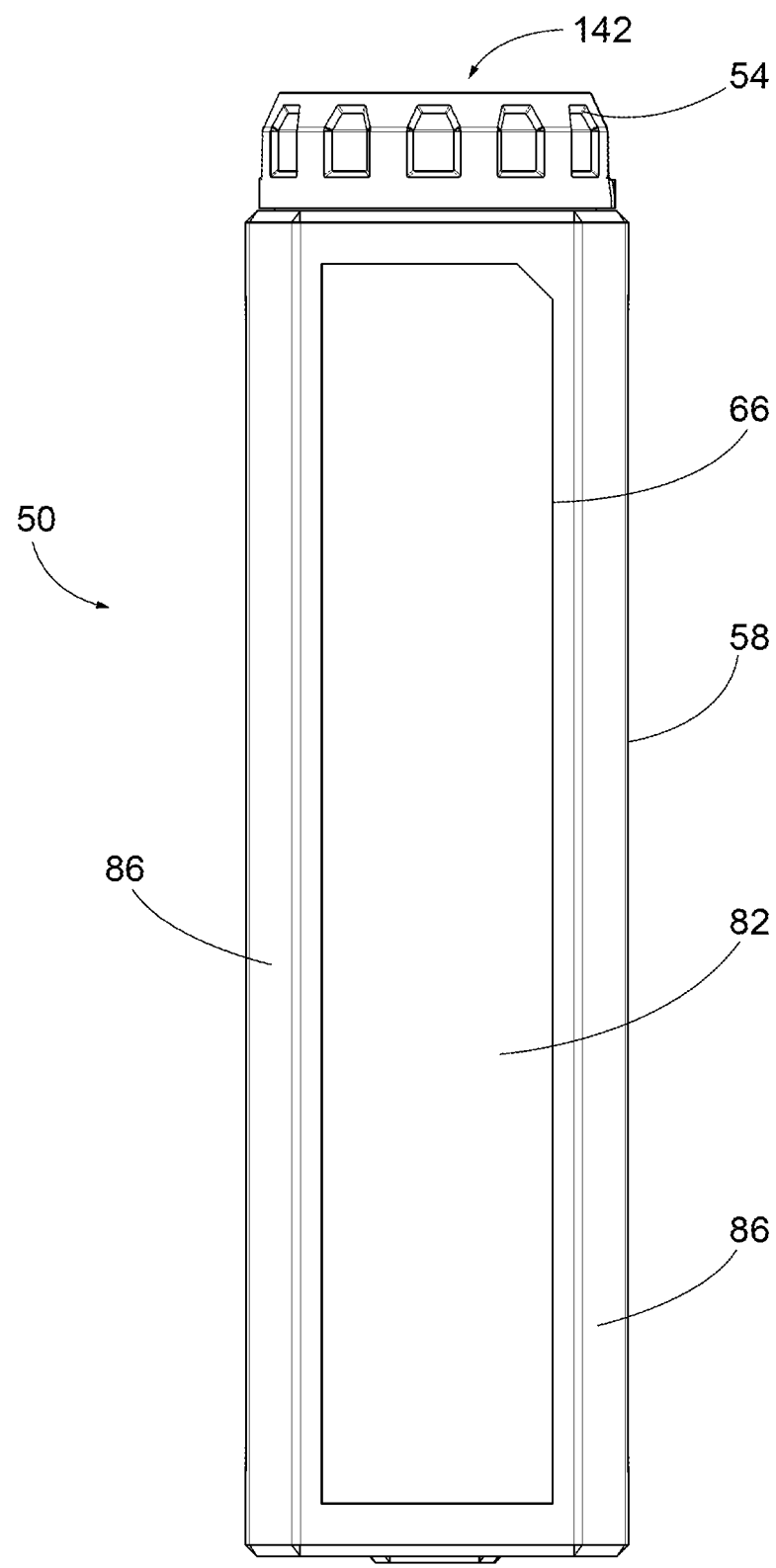
FIG. 3 is a bottom view of the battery charger shown in FIG. 1.
Figure 4:
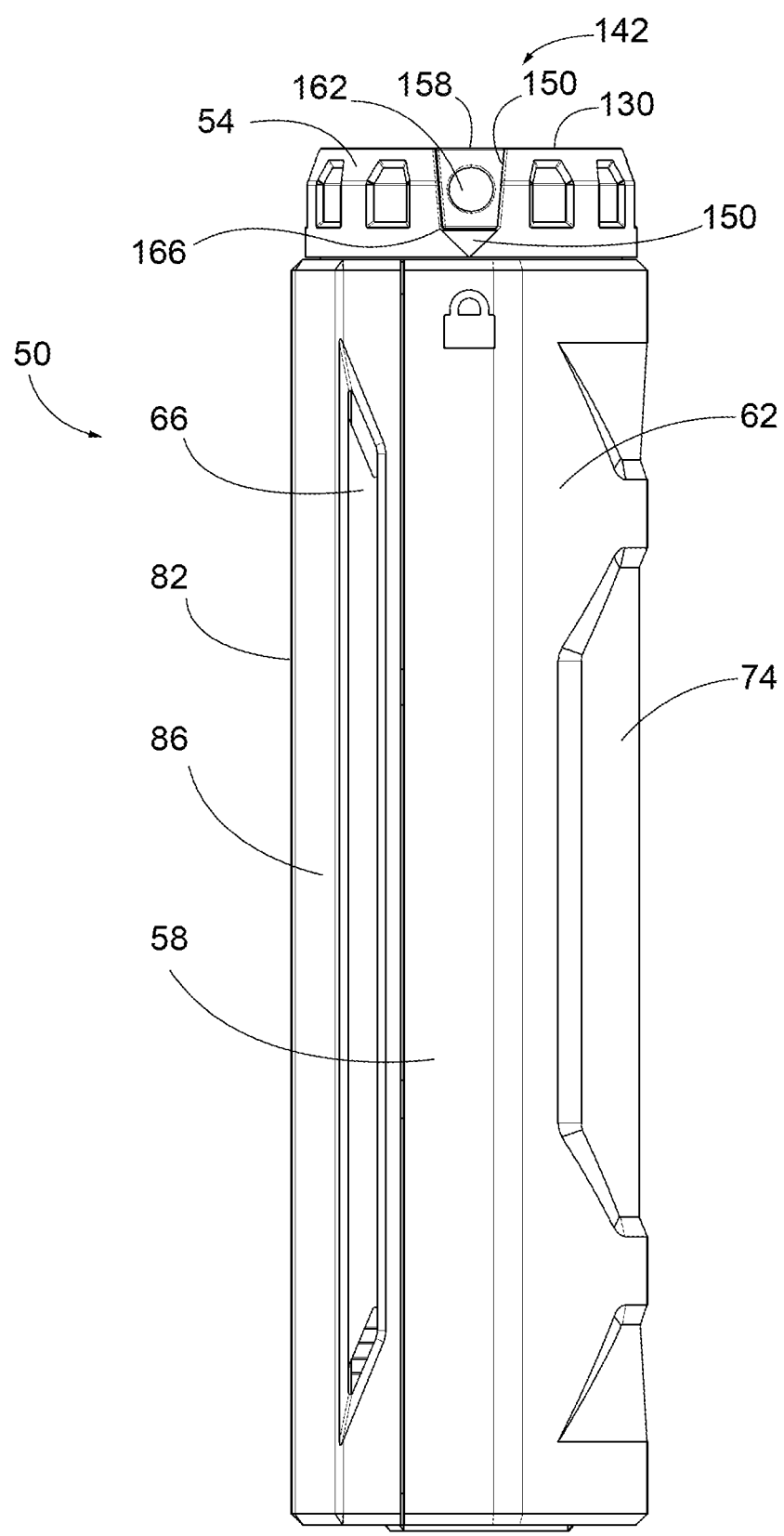
FIG. 4 is a first side view of the battery charger shown in FIG. 1.
Figure 5:
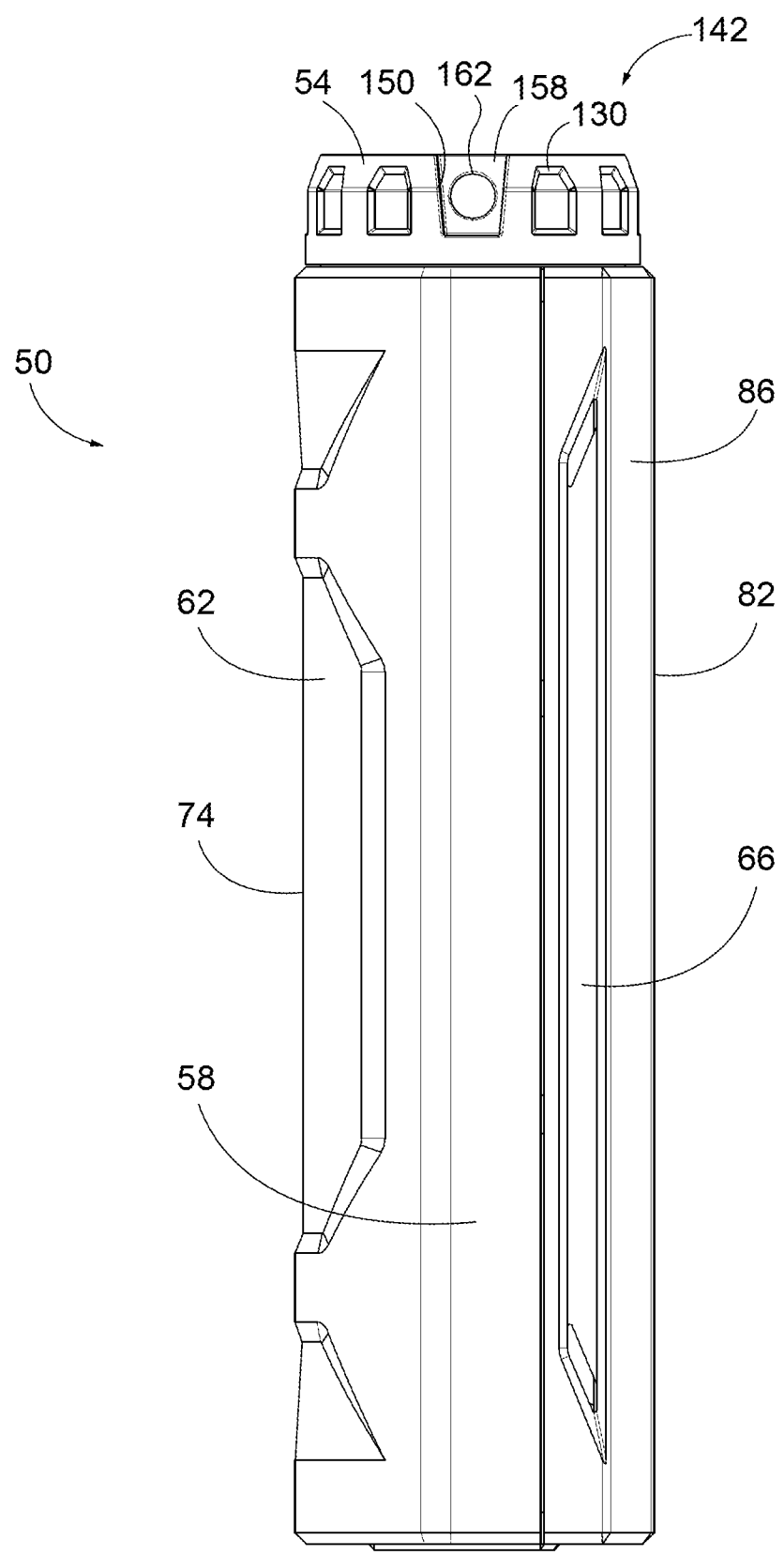
FIG. 5 is a second side view of the battery charger shown in FIG. 1.

With reference to FIGS. 1-9, the housing 58 includes an upper housing 62 coupled to a lower housing 66 to define a cavity 70 (FIG. 10) therein. The cavity 70 has a shape complementary to the battery pack 350 to be charged (e.g., generally cylindrical in the illustrated construction). The illustrated upper housing 62 has an outer surface 74 (FIG. 2) and an inner surface 74 defining a generally arcuate shape. The lower housing 66 includes an inner surface 78 defining a complementary (e.g., arcuate) shape and a flat outer surface 82 flanked by chamfered edges 86 (FIG. 3). The flat outer surface 82 is configured to support the charger 50 on a surface (not shown).

Figure 8:
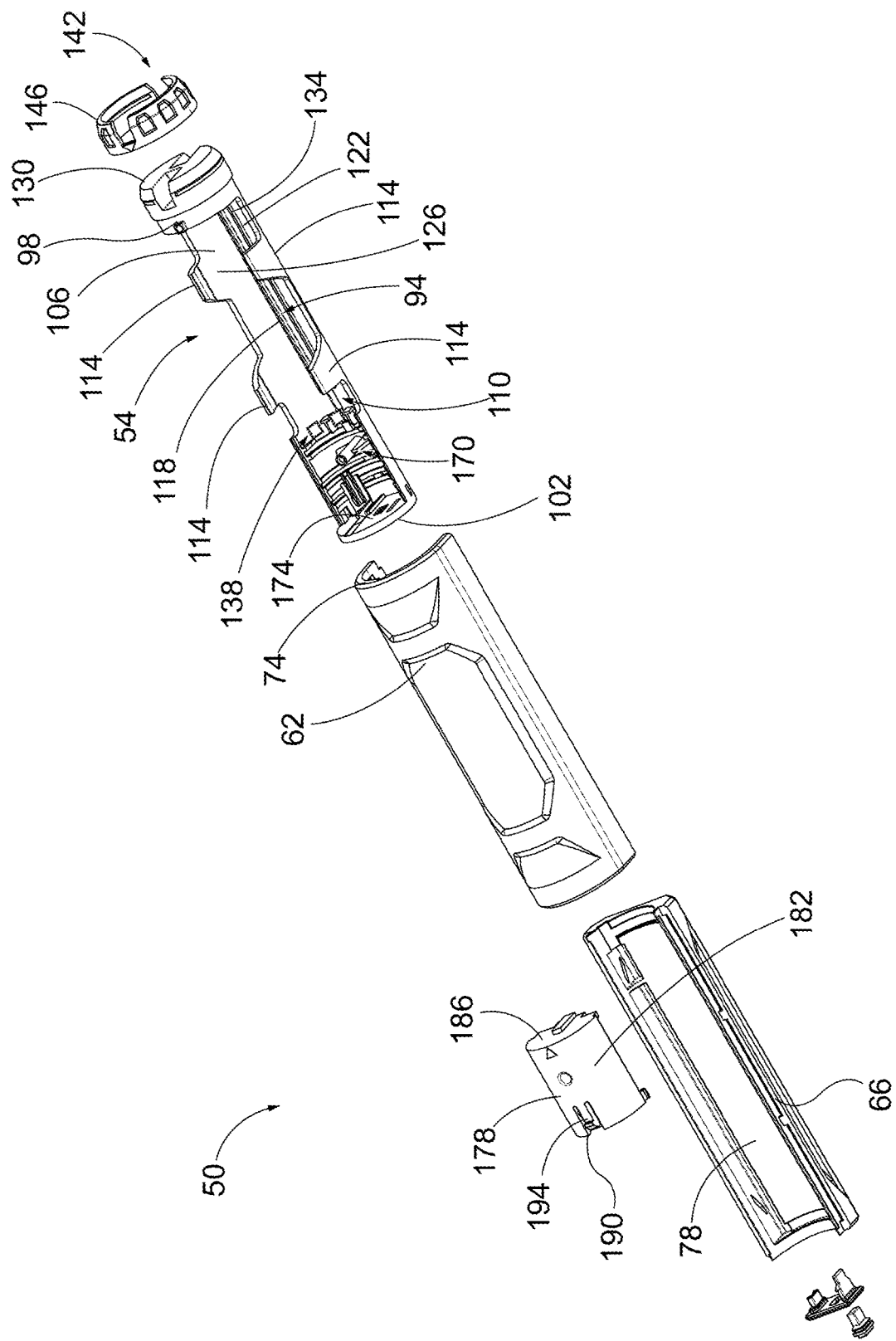
FIG. 8 is an exploded view of the battery charger shown in FIG. 1.
Figure 9:
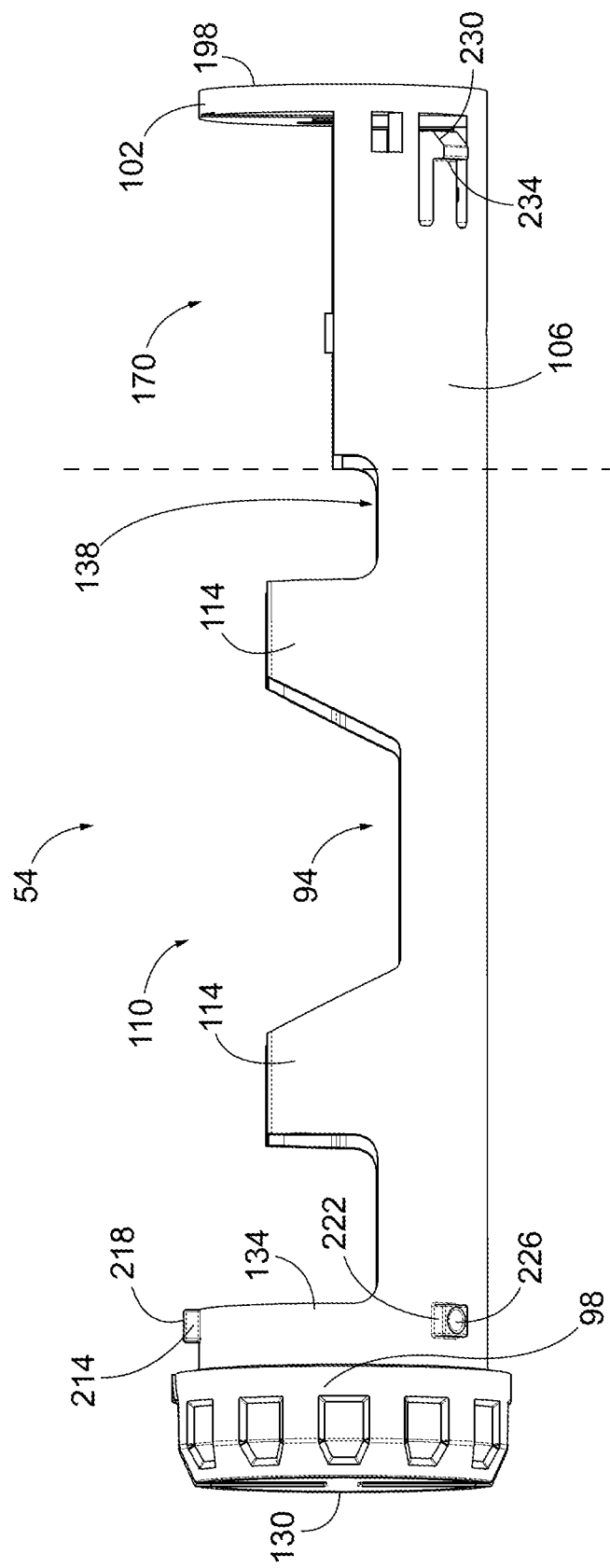
FIG. 9 is a side view of a tray of the battery charger.
Figure 10:
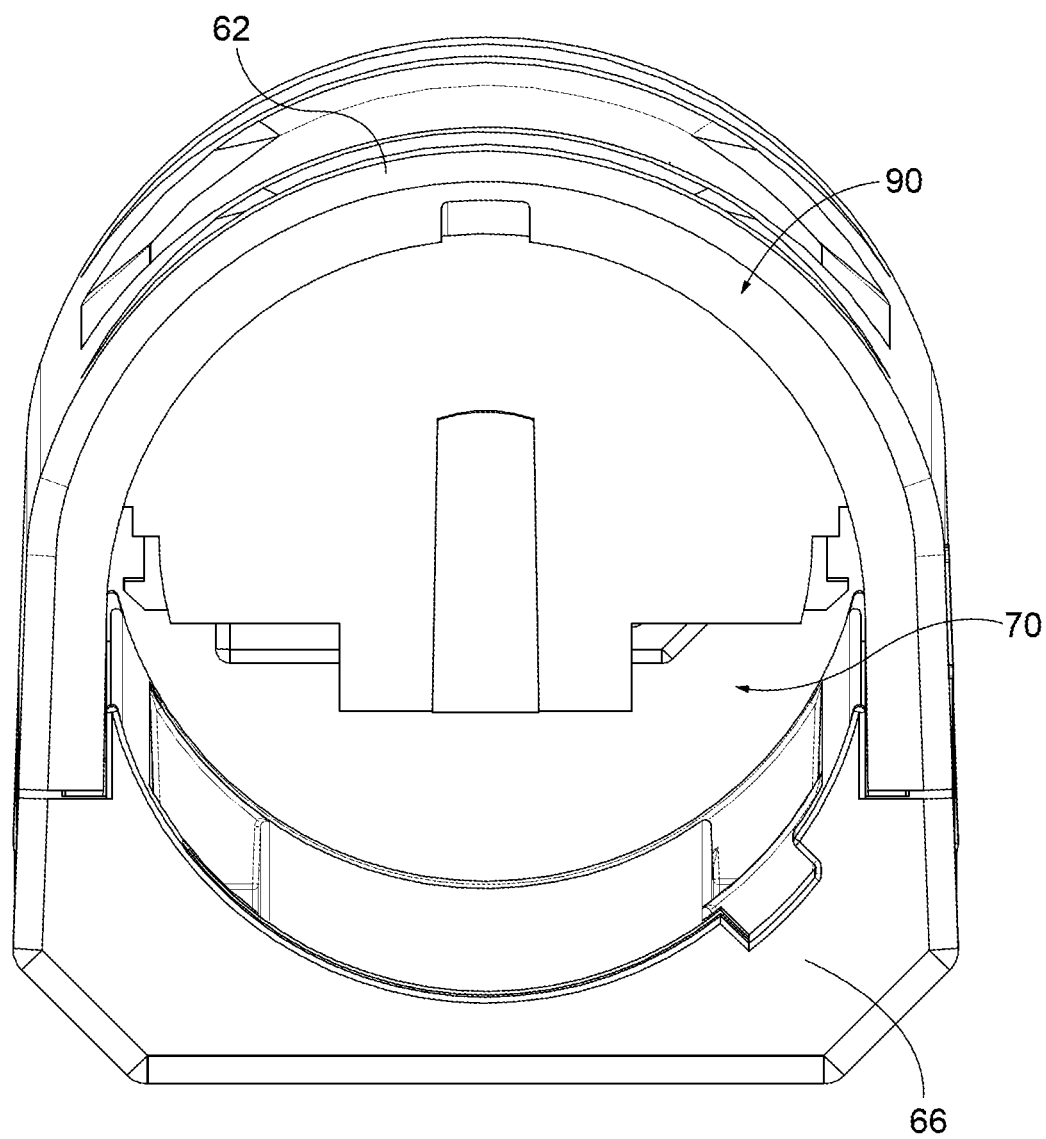
FIG. 10 is a front view of a housing of the battery charger with the tray removed.

The tray 54 is slidably received within the cavity 70 and is operable to slide into and out of a first opening 90 at the end of the housing 58. With reference to FIGS. 8-9, the tray 54 has a substantially cylindrical battery receiving cavity 94 defined by an arcuate sidewall 106 extending between opposite end walls 98, 102. A battery cavity opening 110 exposes the battery receiving cavity 94. Support fingers 114 protrude from an edge of the sidewall 106 and may, for example, assist in retaining and aligning the battery pack 350 within the battery receiving cavity 94.

The battery receiving cavity 94 also includes a pair of projections 118 and a groove 122 extending in an axial direction along an inner surface 126 of the sidewall 106 (FIG. 8). The projections 118 and the groove 122 are configured to engage corresponding structure on a battery pack to facilitate proper alignment of the battery pack within the battery receiving cavity 94. In addition, the projections 118 may act as a "lock out" feature—that is, the projections 118 may prevent battery packs that are not suitable for use with the charger 50 from being fully inserted into the battery receiving cavity 94 and/or electrically connected with the charging circuit. The "lock out" arrangement may be similar to that described and illustrated in International Application No. PCT/CN2016/102208, filed Oct. 14, 2016, the entire contents of which are hereby incorporated by reference.

Figure 19:
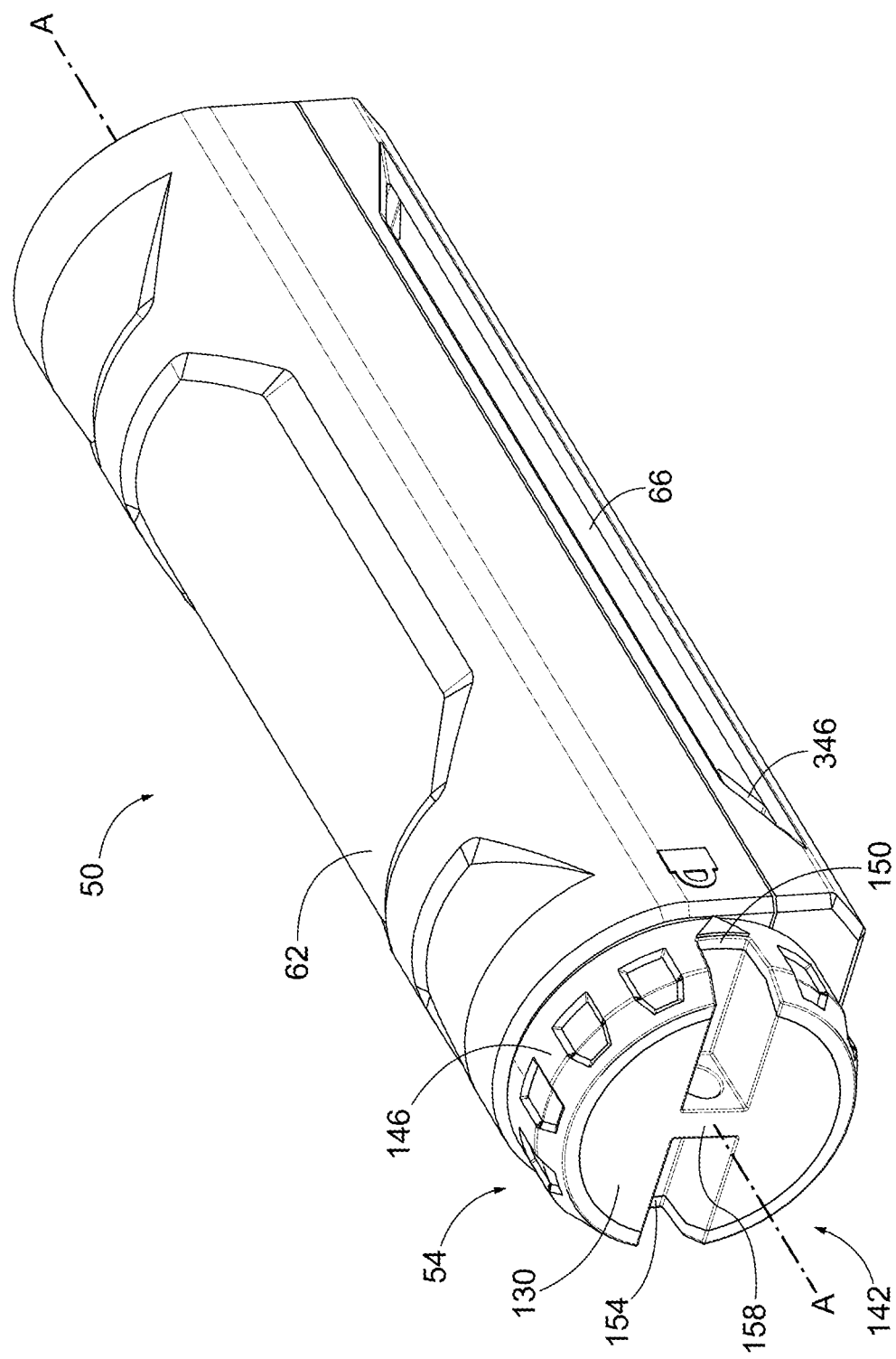
FIG. 19 is a perspective view of the battery charger in a closed, locked configuration.

With reference to FIGS. 1-9, the first end wall 98 of the tray 54 defines an outer surface 130 and an inner surface 134 delimiting one axial end of the battery receiving cavity 94. The end wall 98 includes a user interface 142 with a grip or bumper 146 that circumscribes the end wall 98 and has a visual indicator 150 (e.g., an arrow, a line, a raised surface, a dot, etc.) (FIG. 19). The indicator 150 (e.g., an arrow) is alignable with an indicator 346 (e.g., a lock symbol) on the housing 58 to provide an indication of a condition of the charger 50 (e.g., the tray 54 being in the locked condition).

Figure 6:
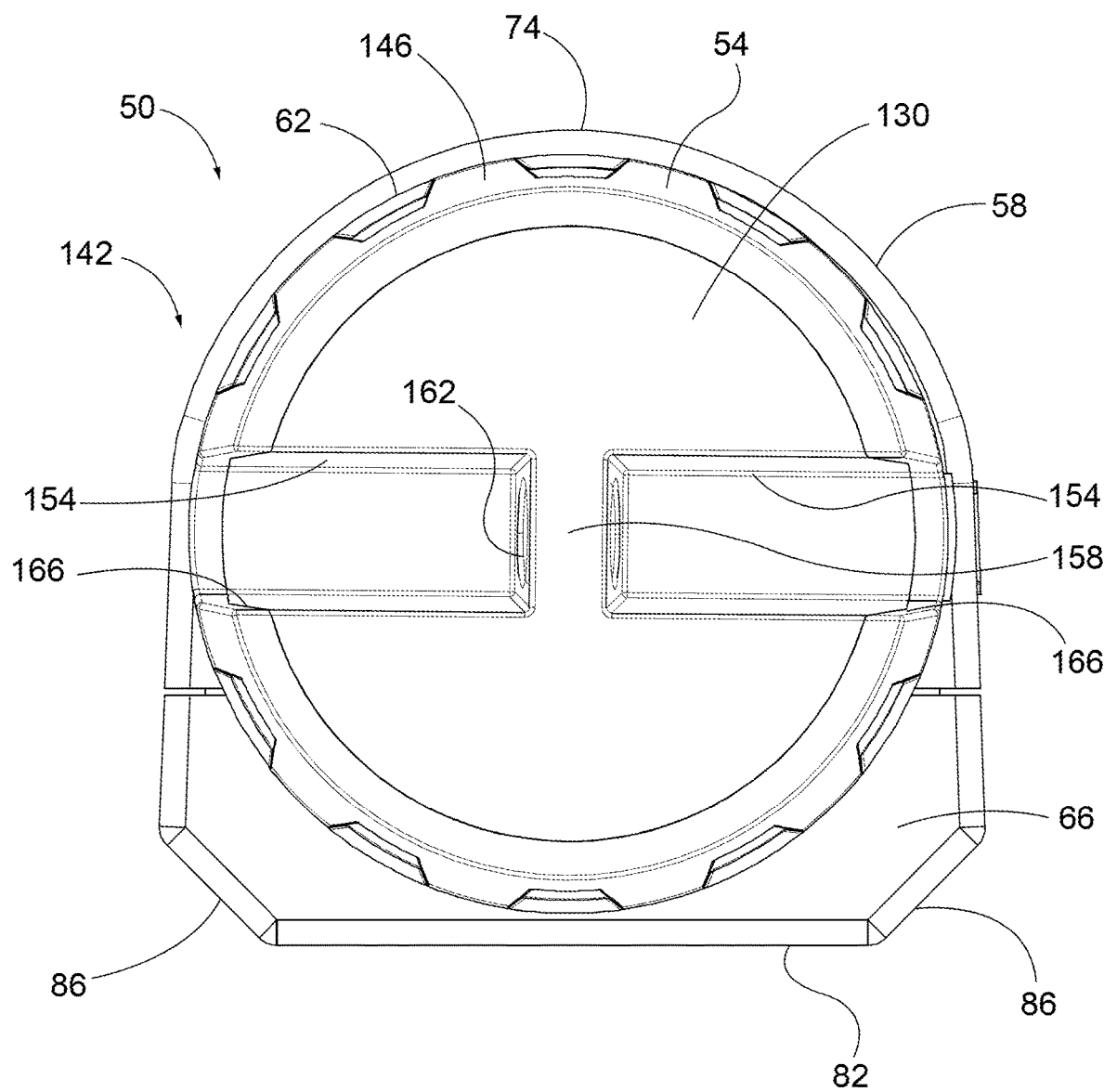
FIG. 6 is a front view of the battery charger shown in FIG. 1.

The user interface 142 further includes a pair of channels 154 extending radially away from a central wall 158 (FIG. 6). In the illustrated embodiment, the central wall 158 includes an aperture 162 extending therethrough, for example, to receive a lanyard, carbiner, etc., for holding the charger 50. In other embodiments (not shown), the aperture 162 may be omitted. As shown in FIG. 6, the bumper 146 has a pair of grooves 166 aligned with the channels 162 such that the channels 162 are open along a radial extent of the first end wall 98. In the illustrated embodiment, the visual indicator 150 is adjacent and aligned with one of the grooves 166. The grooves 166 thus cooperate with the indicators 150, 346 to provide an indication of the condition of the charger 50 (e.g., the tray 54 being in the locked condition).

In other embodiments (not shown), additional indicators 150, 346 may be provided. For example, locked indicators (150, 346) may be provided on the side of the housing 58 opposite to the illustrated indicators 150, 346 (shown in FIG. 4). In addition, one or more "unlocked" indicators (not shown) may be provided on the housing 58 (for example on the top and/or bottom) to align with the indicator(s) 150 when the charger 50 is in the unlocked configuration (see FIG. 20). An indicator (not shown) to indicate a direction for pivoting movement from the locked condition toward the unlocked condition (or vice versa) may be provided.

In other embodiments (not shown), the visual indicator 150 may be disposed at any suitable location on the tray 54 (e.g., at another location along the circumference of the end wall 98 or the bumper 146, on an axial surface of the end wall 98, within a groove 166, etc.).

The second end includes (see FIGS. 8 and 25-26) a charging circuit housing section 170 housing electrical components of the charger 50 (e.g., components of the charging circuit 210). Terminal contacts 138 (see FIGS. 8 and 25) are located in the battery receiving cavity 94 and are electrically connected to the charging circuit 210. The contacts 138 are configured to electrically engage terminals of the battery pack 350 (see FIG. 22).

Figure 23:
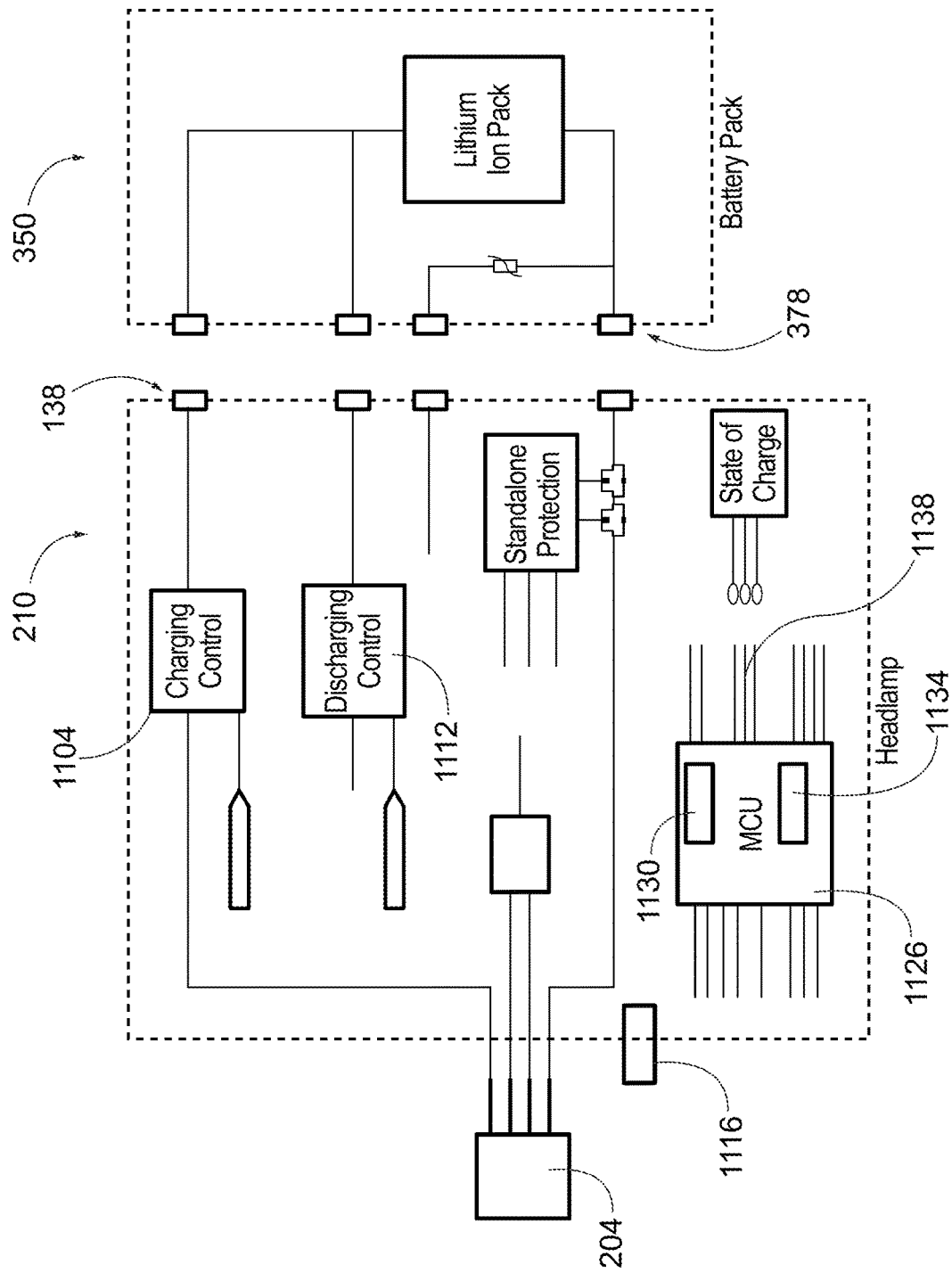
FIG. 23 is a schematic diagram of the battery charger and the battery pack.
Figure 24:
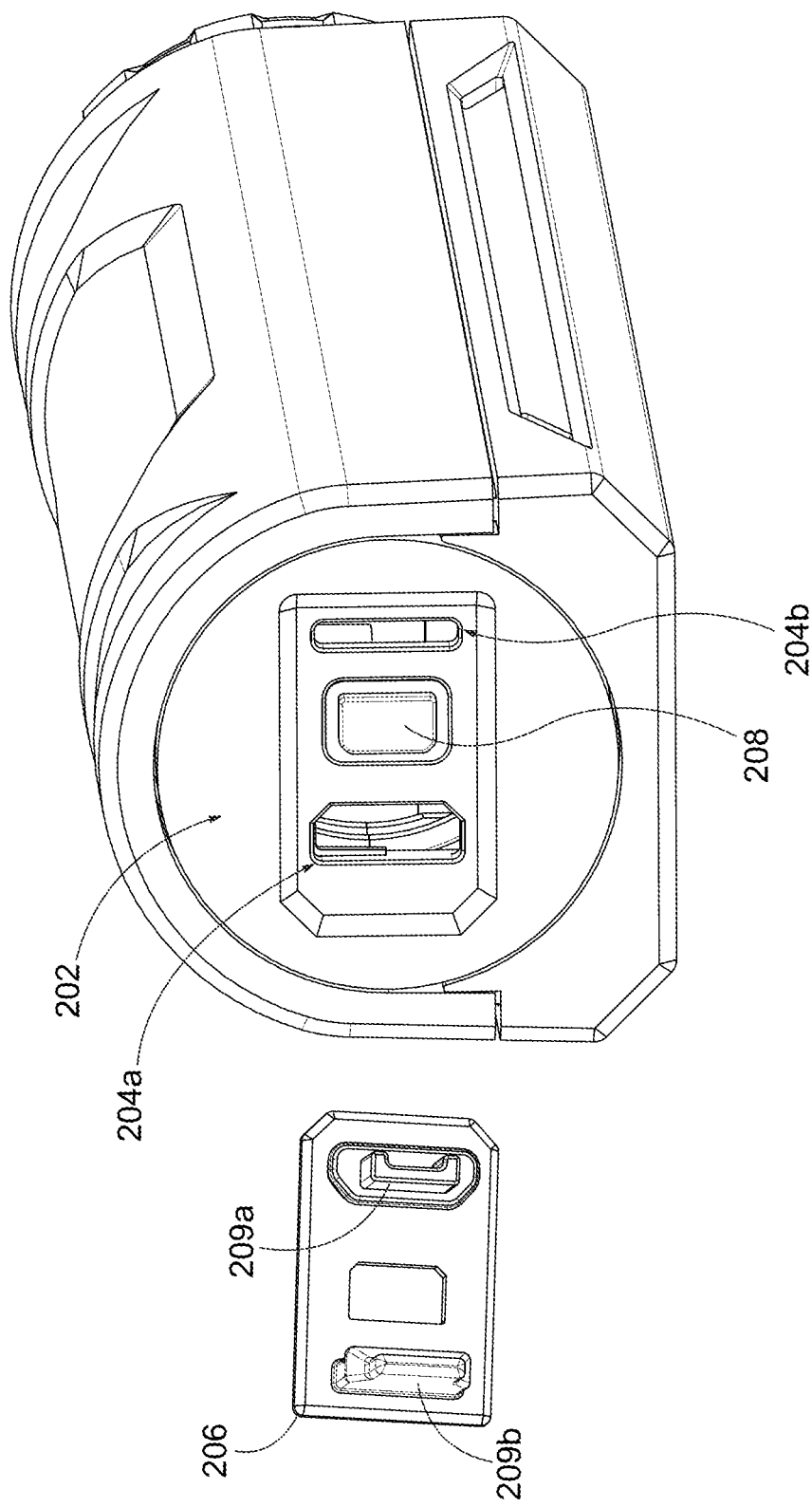
FIG. 24 is a rear perspective view of the charger with the power inlet cover removed.
Figure 25:
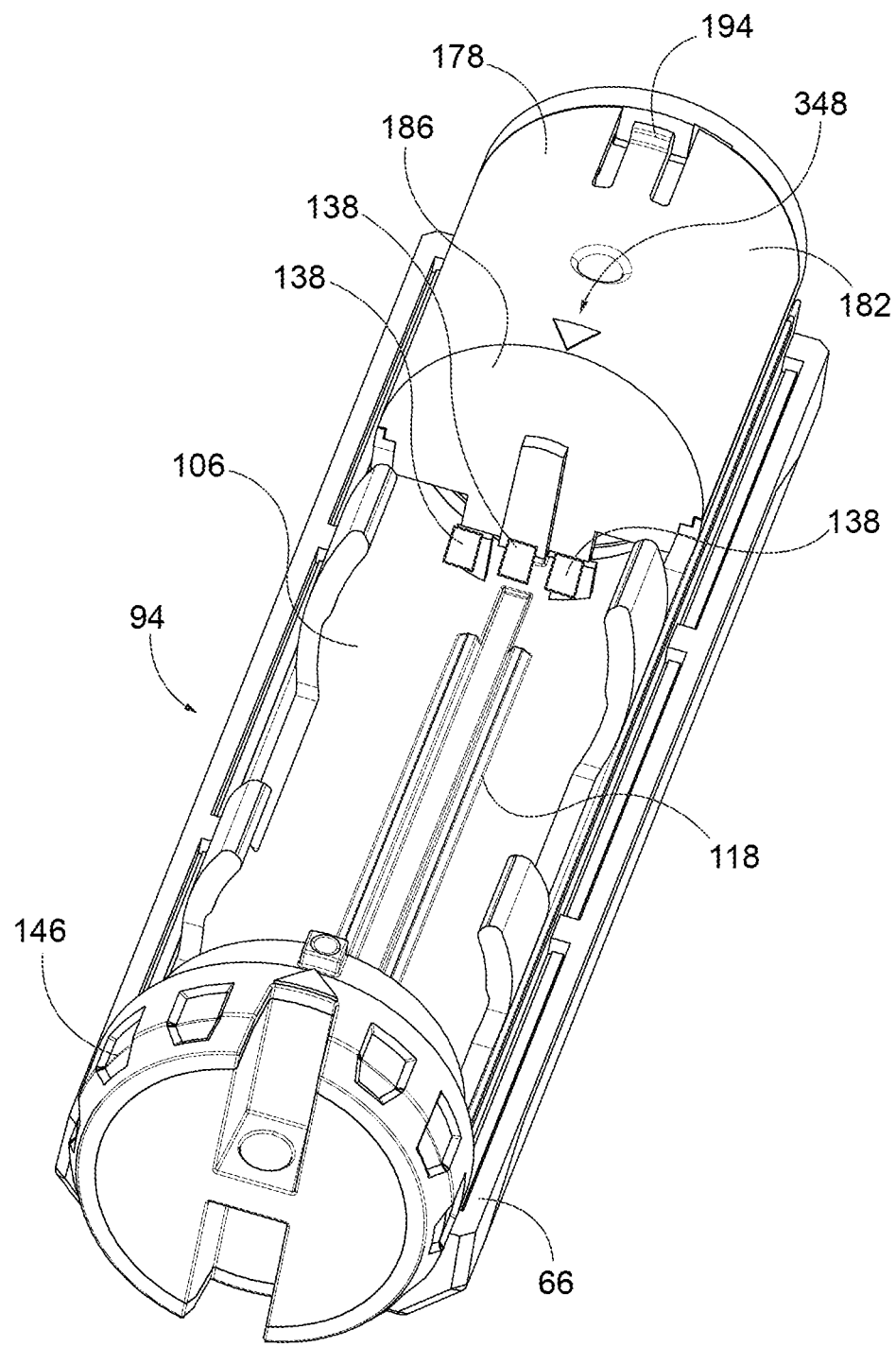
FIG. 25 is a front perspective view of the charger with the first housing portion removed.
Figure 26:
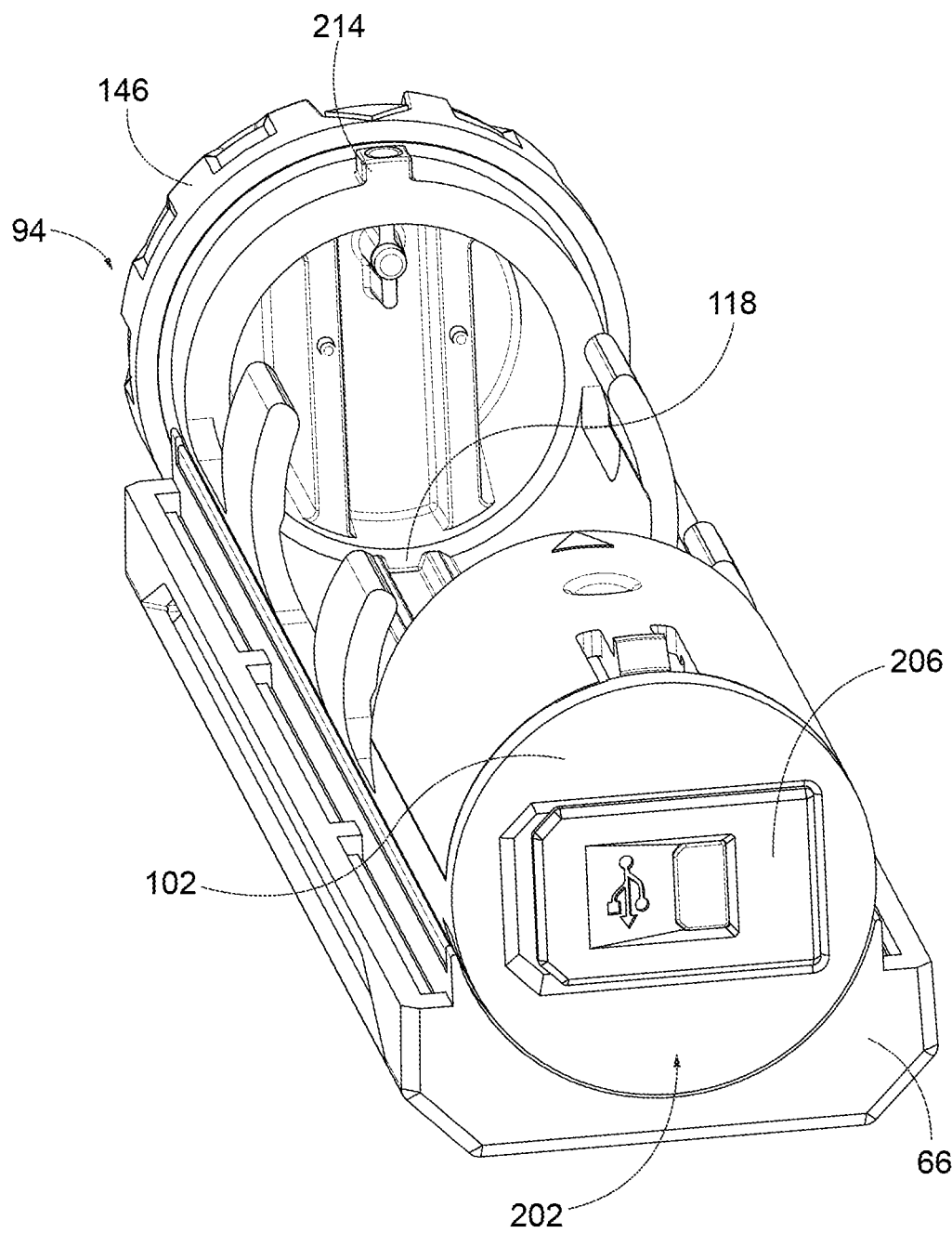
FIG. 26 is a rear perspective view of the charger as shown in FIG. 25 with the first housing portion removed.

As shown in FIGS. 25-26, the charging circuit housing section 170 is defined by a portion of the sidewall 106, an inner surface 174 (FIG. 8) of the second end wall 102, and a charging circuit housing member 178 coupled to the tray 54. The housing member 178 includes an arcuate sidewall 182 and an axial outer end surface 186 delimiting another axial end of the battery receiving cavity 94. The charging circuit housing member 178 is engageable with the tray 54 (e.g., via latches engaging catches (as illustrated), press fitting, welding, adhesive, etc.) to enclose the section 170 and the charging circuit 210 (FIG. 23). As shown in FIGS. 8 and 25-26, the charging circuit housing member 178 also includes a latch 190 protruding away from an outer surface of the sidewall 182. The latch 190 includes an engagement surface 194.

Figure 7:
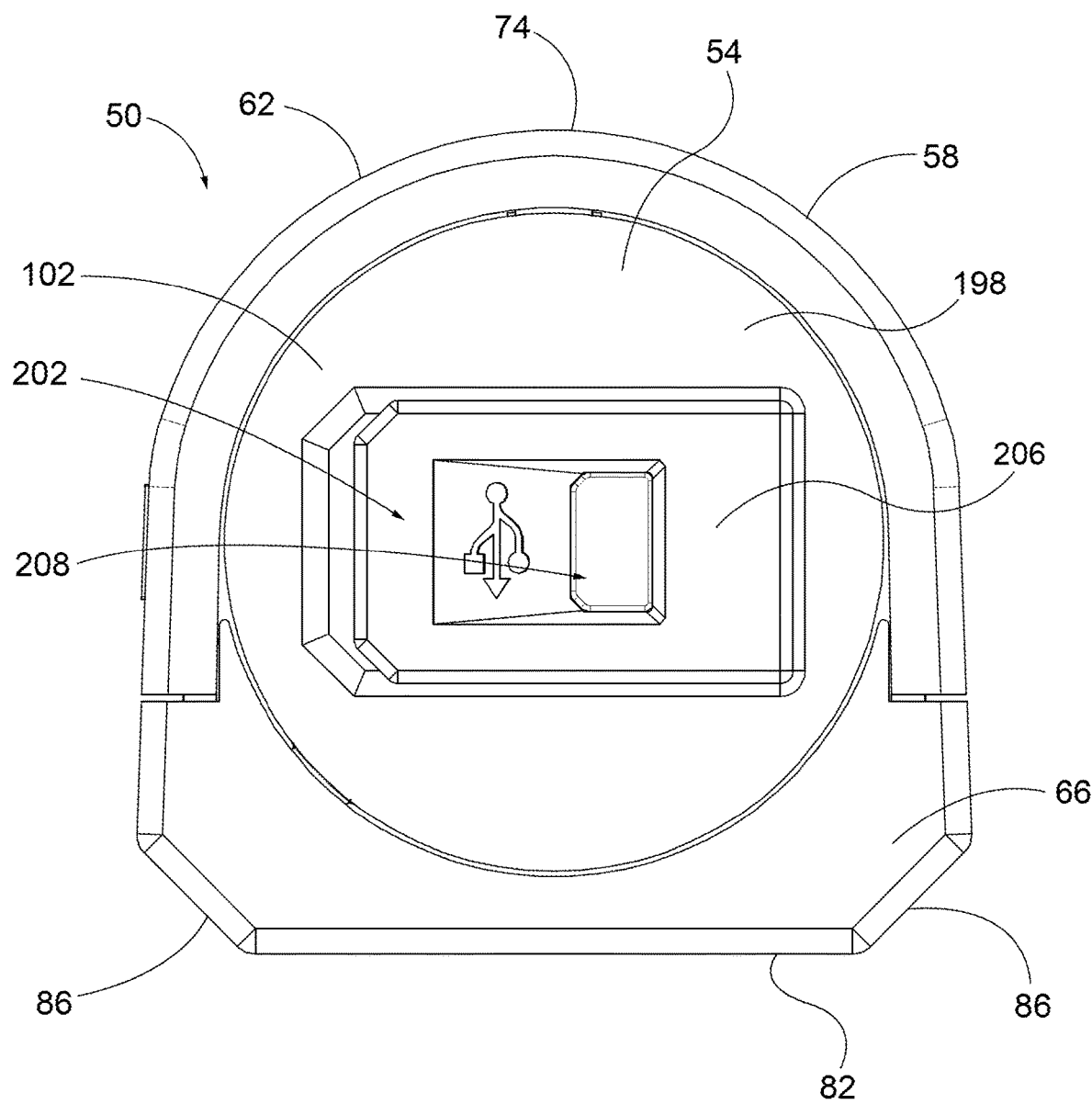
FIG. 7 is a rear view of the battery charger shown in FIG. 1.

As shown in FIG. 7, an outer surface 198 of the second end wall 102 includes a power inlet 202. The power inlet 202 is configured to receive electrical power from an external power source to supply the power to the battery 350 via a charging circuit 210 (see FIG. 23) contained at least partially within the charging circuit housing section 170. The power inlet 202 may include one or more power inlet ports 204 (e.g., a USB Micro-B port, a USB Type B port, USB Type C port, etc.) covered by a movable (e.g., pivoting, flexible, etc.) cover or door 206. In the illustrated embodiment (see FIG. 24), the power inlet 202 includes two power inlet ports 204a, 204b of different types covered by the door 206. The door 206 is supported on a post 208 and insert portions 209a, 209b are receivable in the ports 204a, 204b, respectively.

With particular reference to FIG. 9, the tray 54 also includes a first protrusion 214 having a detent recess 218 and a second protrusion 222 having a detent recess 226, with each protrusion 214, 222 being defined on the sidewall 106 of the tray 54 proximate the first end wall 98. The protrusions 214, 222 are substantially the same size and shape and are disposed along a common axial plane. As shown in FIG. 9, the protrusions 214, 222 are circumferentially spaced along the sidewall 106. In the illustrated embodiment, the spacing defines an angle of approximately 120°. In other constructions (not shown), the angle of the spacing may be different.

With continued reference to FIG. 9, the tray 54 further includes a latch 230 including an engagement surface 234. In the illustrated construction, the latch 230 is disposed on a portion of the sidewall 106 of the tray 54 defining the charging circuit housing section 170. In the illustrated embodiment, the latch 230 is generally aligned with one of the protrusions 214, 222 in the axial direction of the tray 54. However, in other embodiments (not shown), the latch 230 may be disposed at other locations on the sidewall 106.

With reference to FIGS. 10-18, the upper housing 62 and the lower housing 66 are coupled to one another to define the cavity 70 that receives the tray 54. As will be described in greater detail below, both the upper housing 62 and the lower housing 66 include features that engage, align, and retain the tray 54 within the cavity 70.

Figure 14:
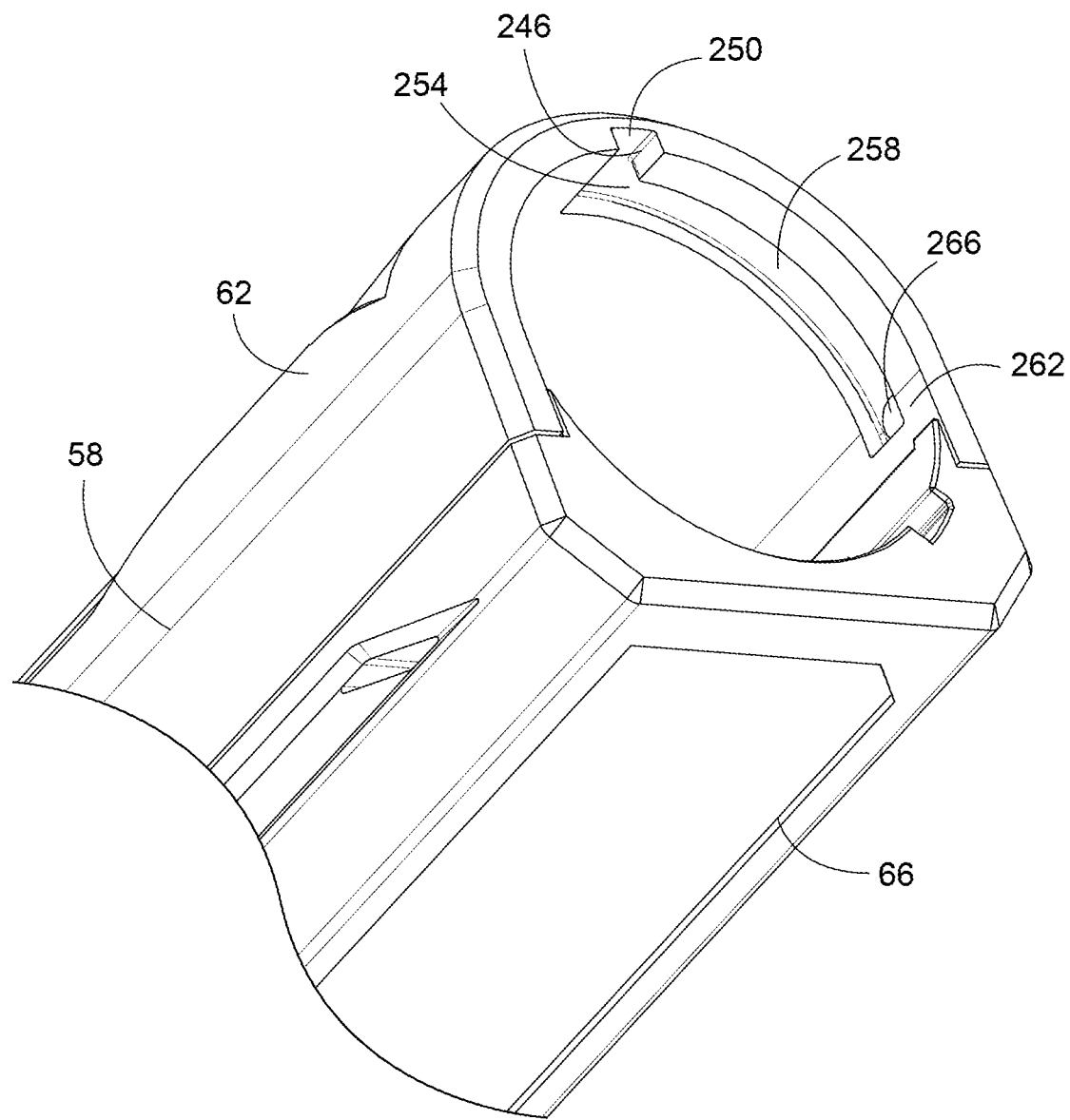
FIG. 14 is a second perspective view of the housing of the battery charger with the tray removed as shown in FIG. 10.

With reference to FIGS. 10-14, the upper housing 62 includes a first bayonet coupling channel 238 and a second bayonet coupling channel 242. Each channel 238, 242 is defined on the inner surface 74 of the upper housing 62. The first channel 238 includes an axial portion 246 extending from an open end 250 of the first channel 238 defined at the first opening 90 to a transition portion 254. The transition portion 254 connects the axial portion 246 to a circumferential portion 258 of the first channel 238. The circumferential portion 258 extends along the circumferential direction of the inner surface 74 along an arc (e.g., about 90°). The circumferential portion 258 terminates at a first end wall 262. A locking member 266 in the form of a round protrusion generally corresponding to the size and shape of the detent 218 is defined adjacent to the first end wall 262 (FIG. 14).

The second channel 242 includes an axial portion 270 extending a length L1 from a first end wall 274 to a transition portion 278. The transition portion 278 connects the axial portion 270 to a circumferential portion 282 of the second channel 242. The circumferential portion 282 extends along the circumferential direction of the inner surface 74 along an arc having an angle corresponding to the circumferential portion 258 (e.g., about 90°). The circumferential portion 282 terminates at a second end wall 286.

Figure 11:
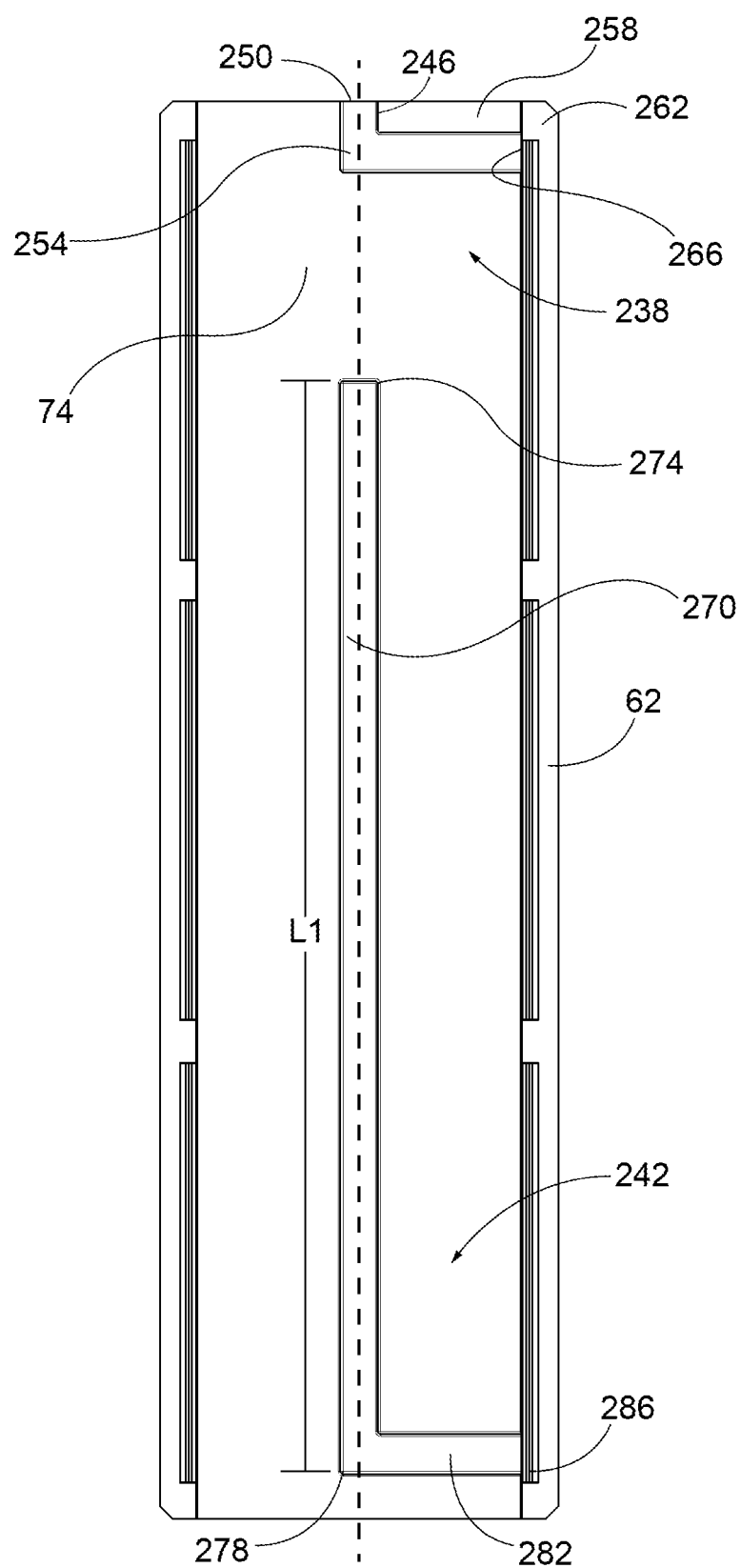
FIG. 11 is a bottom view of a first housing portion of the battery charger.

With reference to FIG. 11, the axial portion 246 of the first channel 238 and the axial portion 270 of the second channel 242 extend coaxially along an apex of the inner surface 74. In addition, the circumferential portion 258 of the first channel 238 and the circumferential portion 282 of the second channel 242 are generally parallel to, but spaced from, one another.

Figure 17:
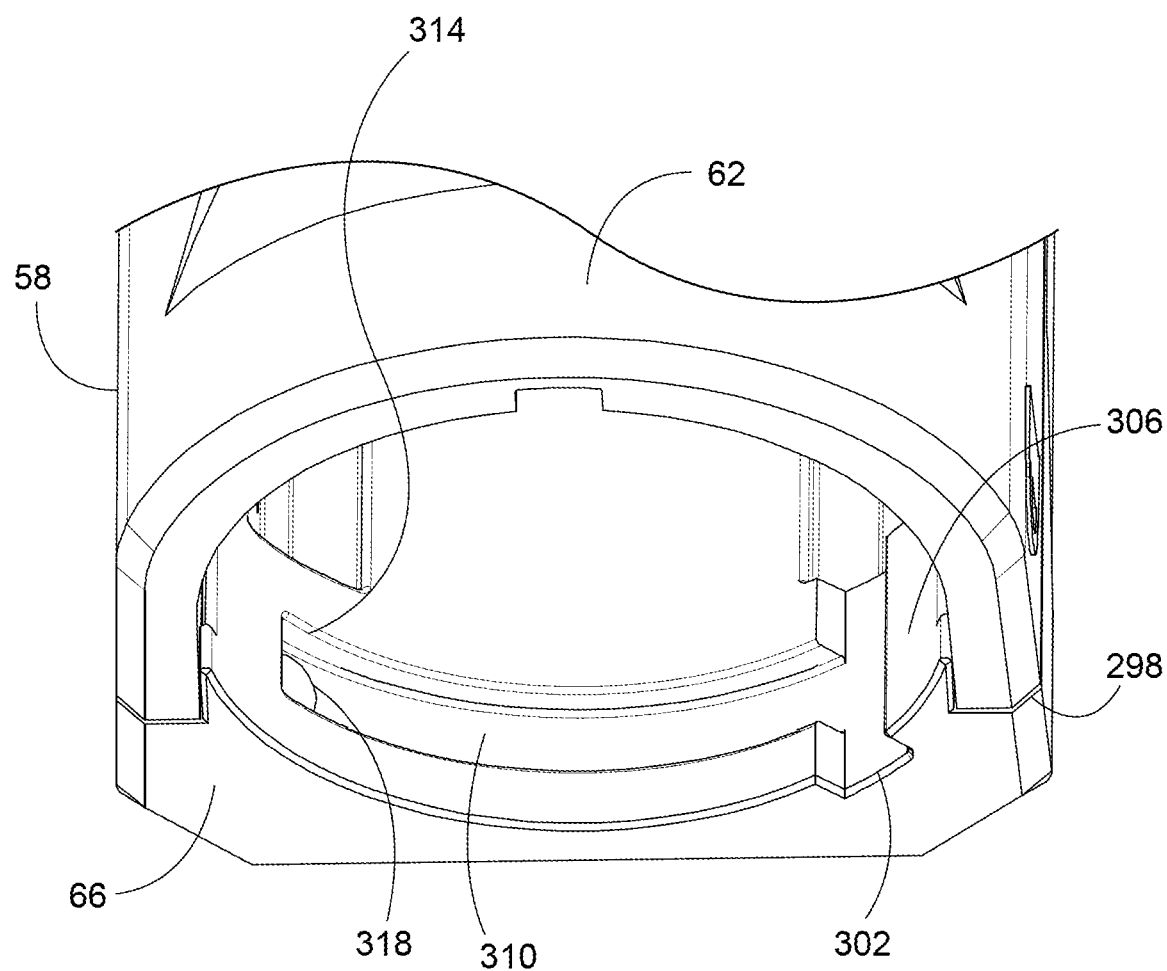
FIG. 17 is a third perspective view of the housing of the battery charger with the tray removed as shown in FIG. 11.
Figure 18:
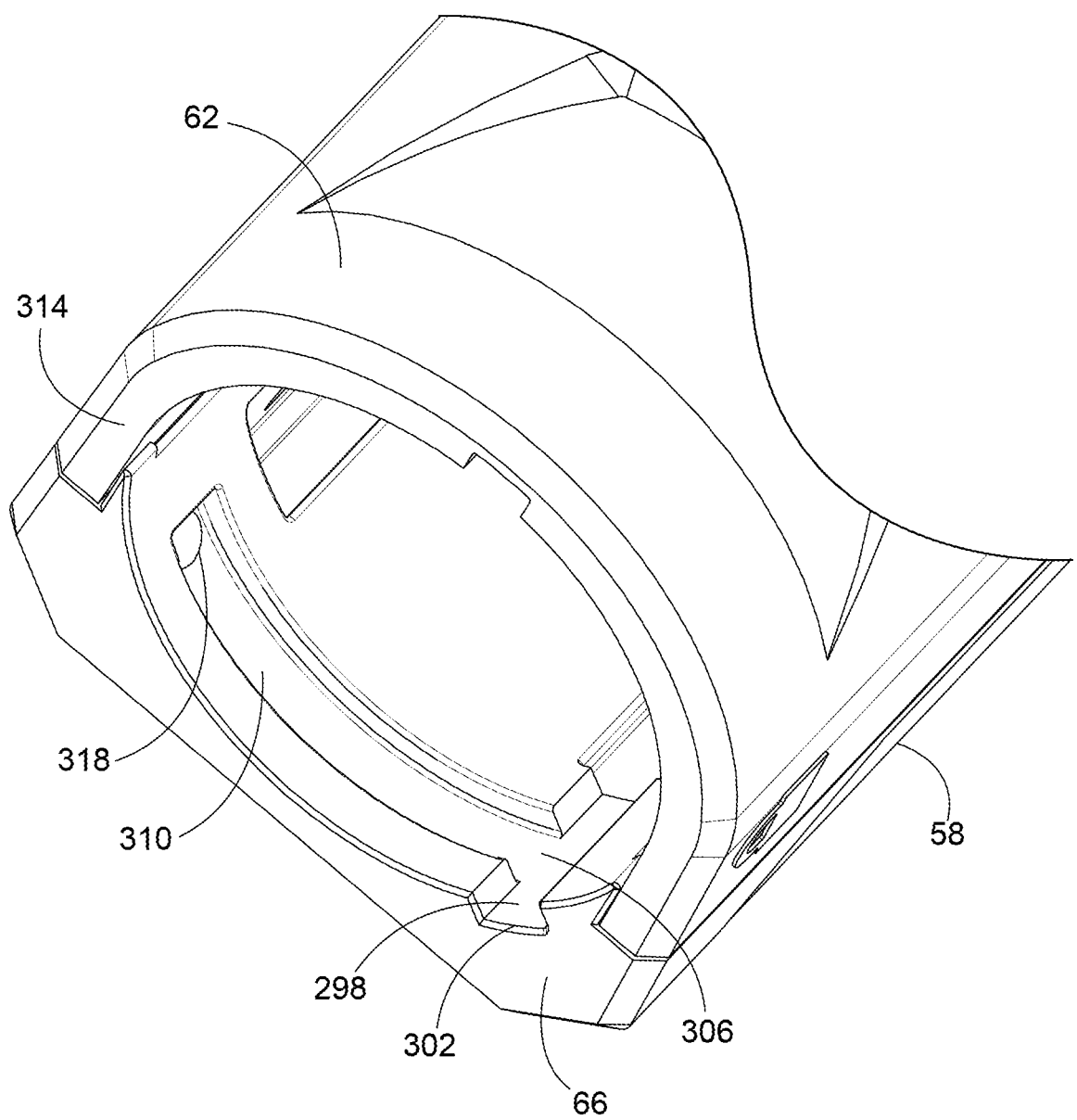
FIG. 18 is a fourth perspective view of the housing of the battery charger with the tray removed as shown in FIG. 10.

With reference to FIGS. 10 and 15-18, the lower housing 66 includes a first bayonet coupling channel 290 and a second bayonet coupling channel 294. Each channel 290, 294 is defined on the inner surface 78 of the lower housing 66. The first channel 290 includes an axial portion 298 extending from an open end 302 defined at the first opening 90 to a transition portion 306. The transition portion 306 connects the axial portion 298 to a circumferential portion 310 of the first channel 290. The circumferential portion 310 extends along the circumferential direction of the inner surface 78 along an arc (e.g., about 90°). The circumferential portion 310 terminates at a first end wall 314. A locking member 318 in the form of a round protrusion generally corresponding to the size and shape of the detent 226 is defined adjacent to the first end wall 314 (FIGS. 17-18).

Figure 12:
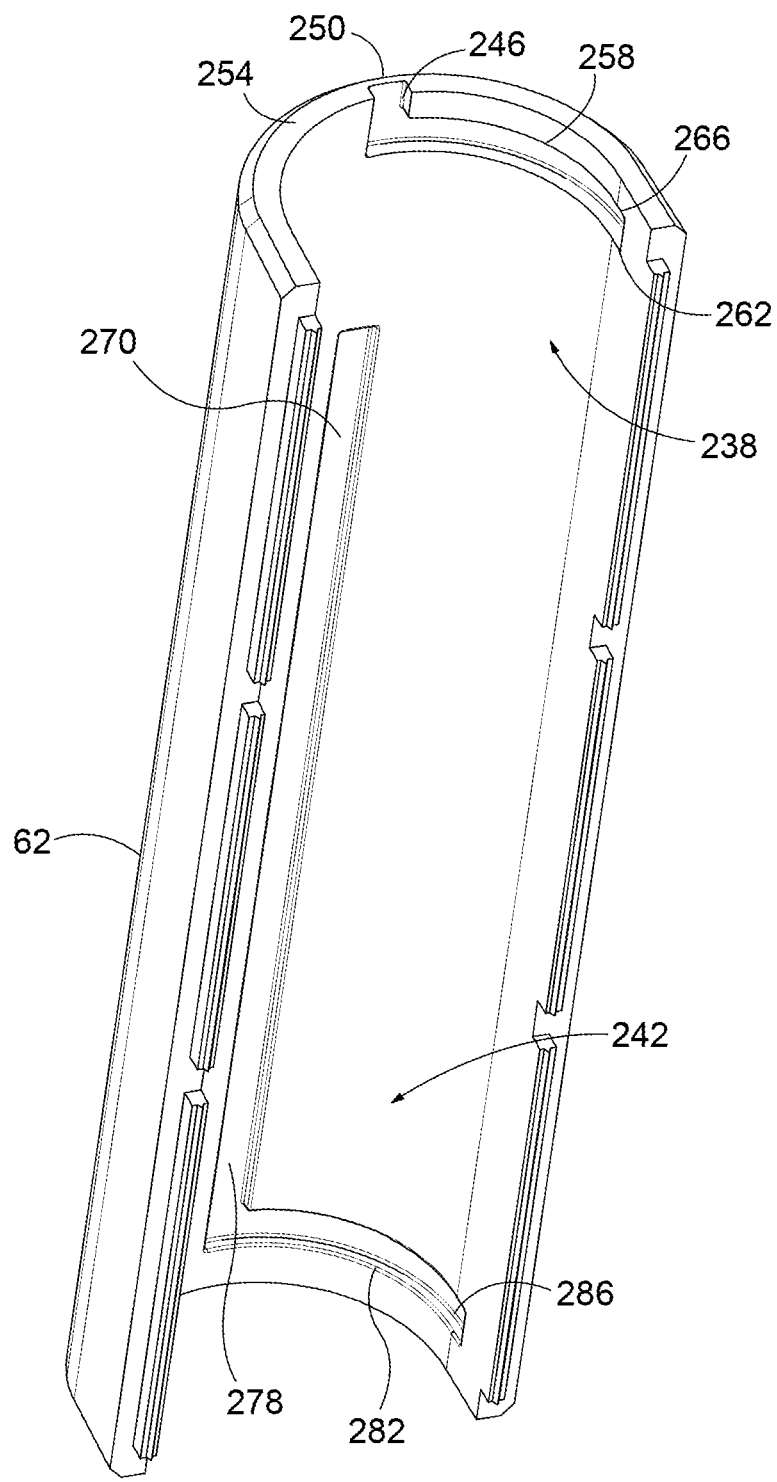
FIG. 12 is a perspective view of the first housing portion shown in FIG. 11.
Figure 13:
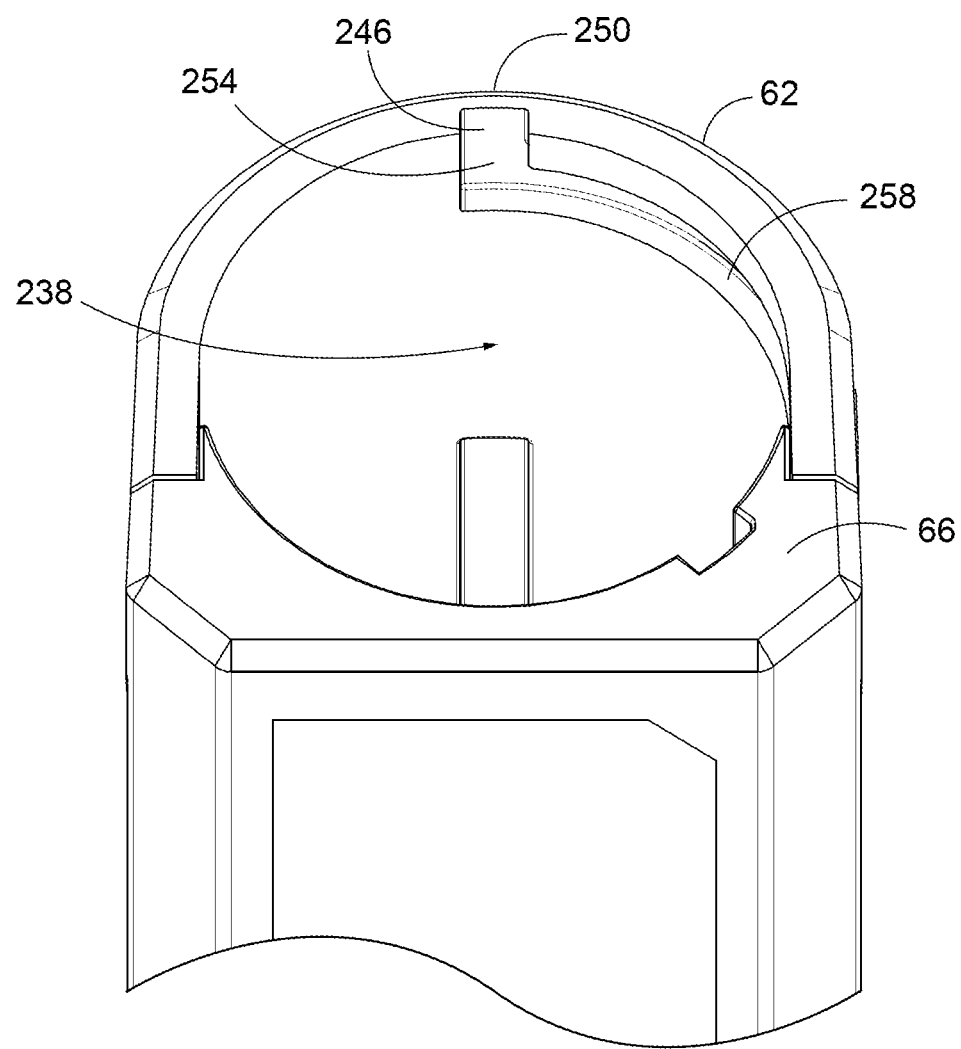
FIG. 13 is a first perspective view of the housing of battery charger with the tray removed as shown in FIG. 10.

The second channel 294 includes an axial portion 322 that extends a length L1' from a first end wall 326 to a transition portion 330. It should be noted that the length L1' is equal to the length L1. The transition portion 330 connects the axial portion 322 to a circumferential portion 334 of the second channel 294. The circumferential portion 334 extends along the circumferential direction of the inner surface 78 along an arc corresponding to the circumferential portion (e.g., about 90°). The circumferential portion 334 terminates at a second end wall 338. A second locking member 342 in the form of a catch generally corresponding to the size and shape of the latch 230 is defined adjacent to the second end wall 338 (FIG. 12).

Figure 15:
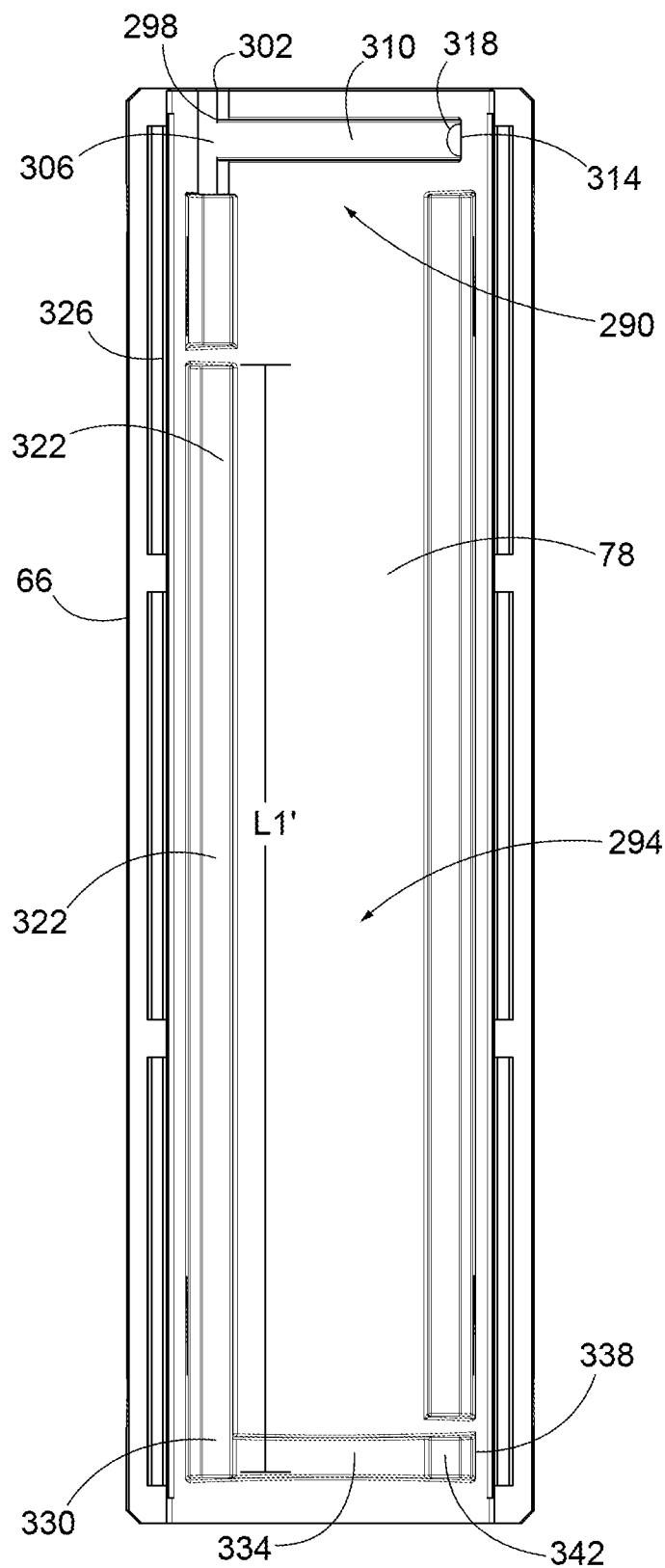
FIG. 15 is a top view of a second housing portion of the battery charger.
Figure 16:
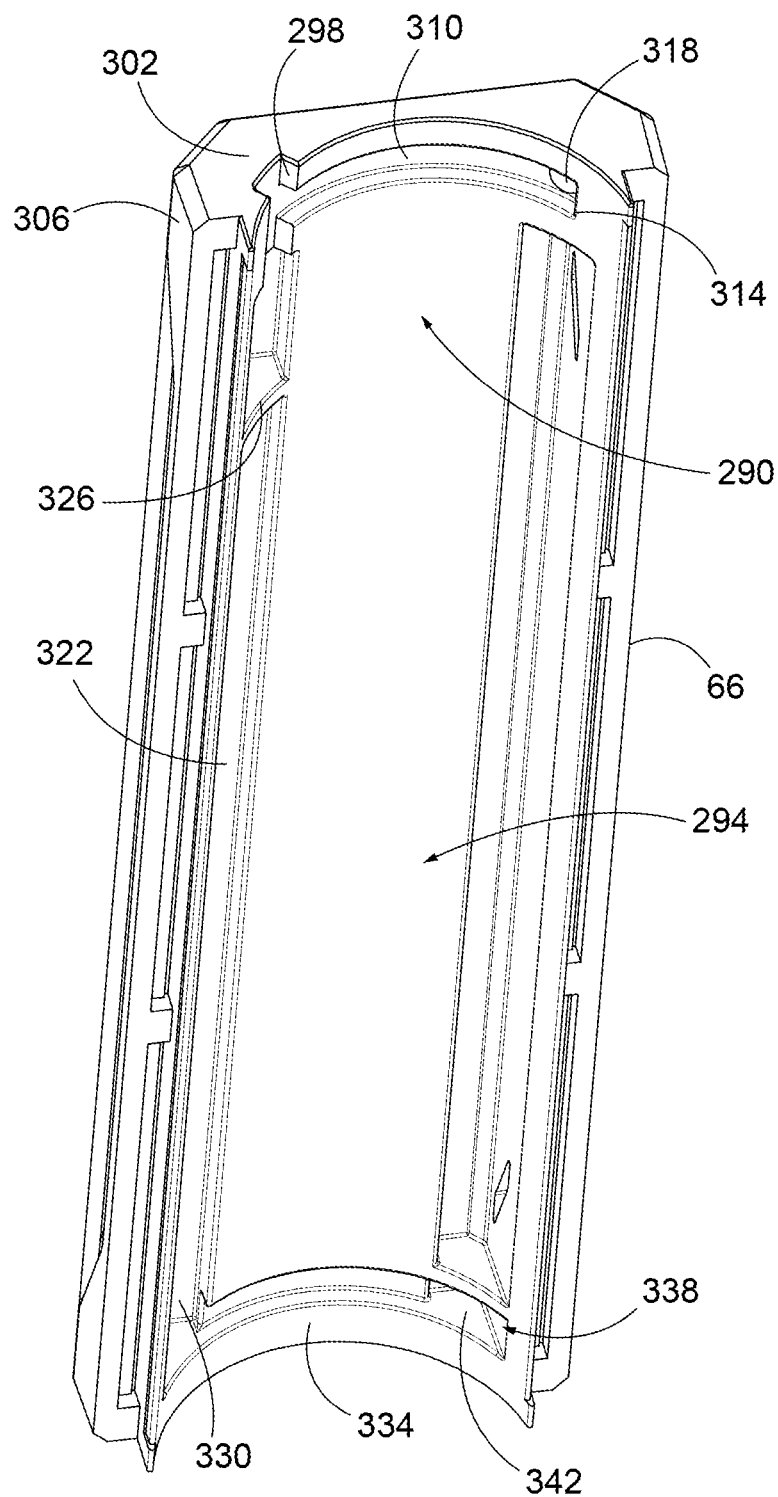
FIG. 16 is a perspective view of the second housing portion shown in FIG. 15.

With reference to FIG. 15, the axial portion 298 of the first channel 290 and the axial portion 322 of the second channel 294 extend coaxially along the inner surface 78. In addition, the circumferential portion 310 of the first channel 290 and the circumferential portion 334 of the second channel 294 are generally parallel to, but spaced from, one another.

When assembled, the tray 54 is received within the cavity 70 along an insertion axis A and is oriented such that the latch 190 of the charging circuit housing member 178 is received within the second channel 242 of the upper housing 62 and the latch 230 of the tray 54 is received within the second channel 294 of the lower housing 66 such that each latch 190, 230 is slidable within the corresponding second channel 242, 294. In addition, the protrusions 214, 222 of the tray 54 are receivable within the first channel 238 of the upper housing 62 and the first channel 290 of the lower housing 66, respectively.

Figure 20:
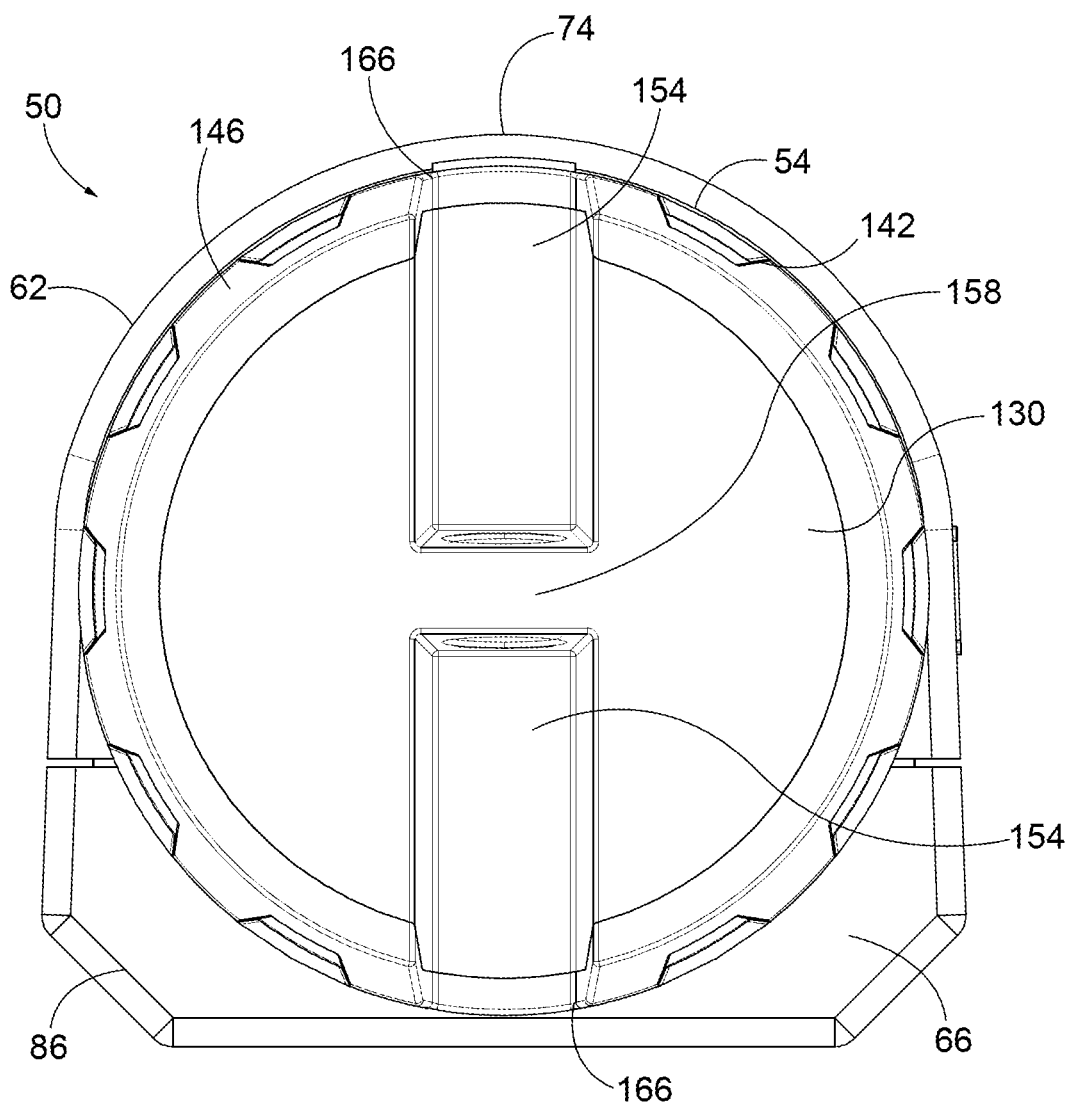
FIG. 20 is a front view of the battery charger in a closed, unlocked configuration.

With reference to FIGS. 19-21, the tray 54 is adjustable between a closed, locked configuration (FIG. 19), a closed, unlocked configuration (FIG. 20), and an open configuration (FIG. 21). In the closed, locked configuration, the tray 54 is fully received within cavity 70 of the housing 58 along the insertion axis A. The detent 218 of the first protrusion 214 and the detent 226 of the second protrusion 222 engage the locking members 318, 342 in the circumferential portions 258, 310 of the first channels 238, 290 of the upper housing 62 and the lower housing 66, respectively, to maintain the charger 50 in the closed, locked configuration. Additionally, the latch 190 of the charging circuit housing member 178 and the latch 230 of the tray 54 are disposed in the circumferential portions 282, 334 of the second channels 242, 294 of the upper housing 62 and the lower housing 66, respectively, such that the latches 190, 230 respectively engage the second end wall 286 and the second locking member 342. In the closed, locked configuration, the visual indicator 150 (along with the grooves 166) is aligned with a second visual indicator 346 on the housing 58 to indicate to a user that the charger 50 is in the closed, locked configuration.

To move the charger 50 into the unlocked, closed position, a user grasps the user interface 142 (e.g., via the bumper 146 or the channels) to pivot the tray 54 about the insertion axis A (e.g., counterclockwise from the position in FIG. 19 to the position in FIG. 20). To pivot the tray 54, the user must apply enough force to disengage the locking members 266, 318 from the detents 214, 226, after which the protrusions 214, 222 slide along the circumferential portions 258, 310 of the first channels 238, 290 toward the transition portions 254, 306. At the same time, the latches 190, 230 slide along the circumferential portions 282, 334 of the second channels 242, 294 towards the transition portions 278, 330. Once the first protrusion 214 and the second protrusion 222, as well as latches 190, 230 are located with the respective transition portions 254, 306, 278, 330, the charger 50 is considered to be in the unlocked, closed configuration (FIG. 20).

From the unlocked, closed configuration, a user slides the tray 54 out of the housing 58 along the insertion axis A to adjust the charger 50 into the open configuration in which the battery receiving cavity 94 is accessible. To slide the tray 54, the user grasps the user interface 142 and applies a force along the insertion axis A (i.e., pulls the tray 54 out of the housing 58) to cause the tray 54 to slide axially relative to the housing 58. During sliding, the protrusions 214, 222 slide along the axial portions 246, 298 of the first channels 238, 290 of the upper housing 62 and the lower housing 66, respectively, toward and eventually through the open ends 250, 302. At the same time, the latches 190, 230 slide along the axial portions 270, 322 of the second channels 242, 294 of the upper housing 62 and the lower housing 66, respectively.

Once the tray 54 has traveled the entire length L1, L1' away from the housing 58, the engagement surfaces 194, 234 of the latches 190, 230 engage the end walls 274, 326 of the second channels 242, 294 such that the charger 50 is in the open configuration (FIG. 21). The engagement between the surfaces 194, 234 and the end walls 274, 326 limits the distance the tray 54 extends from the housing 58 and prevents the tray 54 from being removed entirely from the housing 58, while still exposing the battery receiving cavity 94 so the user may insert a battery pack 350.

An indicator 348 (e.g., an arrow) is provided proximate the battery receiving cavity 94 (e.g., on the charging circuit housing member 178) to assist with alignment of the battery pack 350 for insertion. The battery pack 350 includes a complementary indicator (not shown) alignable with the indicator 348.

To move return the charger 50 into the closed, locked configuration from the open configuration, the process described above is reversed. In short, a user slides the tray 54 axially into the housing 58 along the insertion axis A and subsequently pivots the tray 54 about the insertion axis A (e.g., clockwise from the position shown in FIG. 20 to the position shown in FIG. 19) until the locking members 266, 318 engage the detents 214, 226 of the protrusions 214, 222.

In other constructions (not shown), only a portion of the tray 54 may be movable to lock the tray 54 in the closed position. For example, the end wall 98 and/or the user interface 142 may support the protrusions 214, 222 and be pivotable relative to the remainder of the tray 54 to engage the circumferential portions 258, 310 and lock the tray 54 in the closed position.

In other constructions (not shown), a different arrangement to hold the tray 54 in the locked position. For example, instead of or in addition to the detents 214, 226 and locking members 266, 318, the first channels 238, 290 and the second channels 242, 294 may include a non-circumferential portion (e.g., an axial notch (not shown)) from the interior end of each circumferential portion 258, 310, 282, 334 into which the associated detent 214, 226 or locking member 266, 318 is received. Engagement in the notches may inhibit movement of the detents 214, 226 and locking member 266, 318 into and through the circumferential portions 258, 310, 282, 334. A biasing assembly (not shown) may apply a force to bias the detents 214, 226 and locking member 266, 318 into the notches.

FIG. 22 illustrates an exemplary battery pack 350 configured to be received within the battery receiving cavity 94 of the charger 50 for charging. The battery pack 350 is configured to be removably received by and power an electronic device (e.g., a light, a drill, a driver, etc.). The battery pack 350 may be similar to the battery pack described and illustrated in International Application No. PCT/CN2016/102208, filed Oct. 14, 2016, the entire contents of which are hereby incorporated by reference.

As shown in FIG. 22, the battery pack 350 includes a cylindrical body 354 having sidewall 358 extending between a first end 362 and a second end 366 and defining an interior cavity (not shown) configured to support at least one battery cell (not shown; e.g., a single battery in the illustrated construction). The battery cell is a lithium-ion battery cell having a nominal voltage of approximately 3.6 V to 4.4 V and, in one specific embodiment, 4.2 V. In other constructions (not shown), the pack 350 may include more than one battery cell connected in series, parallel or combination series-parallel. The nominal voltage of the pack 350 may be varied to meet the requirement of specific applications. In other constructions (not shown), the battery cell(s) may have a different chemistry, nominal voltage, etc.

The sidewall 358 includes axially-extending grooves 370 separated by a protrusion 374. In the illustrated construction, the grooves 370 are configured to receive the projections 118 disposed on the inner surface 126 of the tray 54, while the protrusion 374 is configured to be received within the groove 122 of the tray 54 to facilitate proper alignment of the battery pack 350 within the tray 54.

The battery pack 350 includes a number (e.g. three) electrical contacts 378 configured to electrically engage the terminal contacts 138 of the charger 50 for transfer of power (and/or signals) between the charger 50 to the battery pack 350. In one example, the pack contacts 378 include a positive charge terminal, a positive discharge terminal, and a ground terminal. In one embodiment, the battery pack 350 includes a thermistor coupled to the ground terminal.

FIG. 23 schematically illustrates an exemplary circuit 210 of the charger 50 coupled to the battery pack 350 (FIG. 22) via engagement between the charger contacts 138 and the pack contacts 378. As illustrated, external power is provided to the charging circuit 210 through the power inlet 202 (e.g., a USB-B micro connector) to provide charging current to the battery pack 350 to charge the battery pack 350 via a charging control 1104.

The charger 50 also includes a microcontroller 1126 including at least a memory 1130 configured to store software-based instructions and an electronic processor 1134 configured to execute the software. The microcontroller 1126 may, for example, be configured to control charging and discharging protocols for the battery pack 350, identify when the charger 50 is connected to an external power source, and apply protection protocols for the battery pack 350/charger 50 in addition to monitoring characteristics of the battery pack 350 (e.g., battery pack temperature (via electrical coupling with a thermistor), current, cell voltage, state of charge, etc.), of the external power source (e.g., input voltage, current, etc.).

The protection protocols may include terminating charging or discharging of the battery pack 350 based on the monitored characteristics (e.g., pack temperature reaches a threshold value, cell voltage reaches a threshold value, etc.). In addition, the microcontroller 1126 may be configured to activate one or more indicators 1138 (e.g., LEDs, etc.) to indicate an operational state of the battery pack 350 (e.g., a charge level) or of the charger 50 (e.g., whether charging is occurring). In some embodiments, the charger 50 may include a discharging control 1112 operated by the microcontroller 1126 to discharge the battery pack 350 to a predetermined level prior to executing a charging protocol.

The battery pack 350 may include, for example, a microcontroller including at least a memory configured to store software-based instructions and an electronic processor configured to execute the software, that is configured to accomplish one or more of the functions described above (e.g., charging/discharging control, microcontroller, charging connector, etc.) in cooperation with or independently of the microcontroller 1126 of the charger 50.

The charger 50 described above may allow a battery pack (such as the battery pack 350) to be securely retained within a cavity of the charger 50 to ensure the battery and charger contacts remain engaged when the battery pack is received by/locked into the charger 50. The design may also provide enhanced durability for both the charger 50 and the associated battery packs as the enclosed locking design of the charger 50 protects both the charger contacts and the battery when the charger is in the closed, locked configuration during storage and/or transport.

Although the invention has been described in detail with reference to certain embodiments, variations and modifications exist within the scope and spirit of one or more independent aspects of the invention as described.

One or more independent features and/or independent advantages of the invention may be set forth in the claims.

What is claimed is:

1. A battery charger comprising:
   a housing defining an opening;
   a tray defining a receptacle operable to receive a battery pack, the tray being movable through the opening between an open position, in which the receptacle is accessible, and a closed position, in which the receptacle is closed;
   a charging terminal supported on the tray and configured to electrically connect with a terminal of the battery pack;
   a power inlet on an end opposite the opening, the power inlet being configured to provide a charging current to the battery pack;
   a locking member movable relative to the housing between an unlocked position, in which the tray is movable between the open position and the closed position, and a locked position, in which the tray is retained in the closed position; and
   a user interface coupled to the tray and operable to pivot the locking member between the locked position, in which the tray is fixed relative to the housing, and the unlocked position, in which the tray is movable between the open position and the closed position.

2. The battery charger of claim 1, wherein the locking member is supported on the tray, the tray being pivotable to move the locking member between the unlocked position and the locked position.

3. The battery charger of claim 1, wherein the housing further includes a bayonet coupling channel, the locking member being pivotable through the bayonet coupling channel.

4. The battery charger of claim 1, further comprising a detent arrangement engageable when the locking member is in one of the unlocked position and the locked position to retain the locking member in the one of the unlocked position and the locked position.

5. The battery charger of claim 1, further comprising a user interface configured to pivot the locking member between the unlocked position and the locked position.

6. The battery charger of claim 5, wherein the locking member is supported on the tray, and wherein the user interface is supported by the tray and is configured to pivot the tray to move the locking member between the unlocked position and the locked position.

7. The battery charger of claim 1, wherein the tray has arcuate side walls defining a generally cylindrical receptacle.

8. The battery charger of claim 1, further comprising a stop coupled to one of the tray and the housing and engageable with the other of the tray and the housing to limit movement of the tray from the cavity and through the opening.

9. The battery charger of claim 1, wherein the housing includes a first housing portion and a second housing portion coupled together to define the cavity.

10. A battery charger comprising:
   a housing defining a cavity;
   a tray defining a receptacle and receivable within the cavity, the receptacle being operable to receive a battery pack, the tray being movable relative to the housing between a closed position, in which the receptacle is closed, and an open position, in which the receptacle is accessible;
   a charging terminal supported on the tray and configured to electrically connect with a terminal of the battery pack;
   a power inlet on an end opposite the cavity, the power inlet being configured to provide a charging current to the battery pack; and
   a user interface coupled to the tray and operable to pivot the tray between a locked position, in which the tray is fixed relative to the housing, and an unlocked position, in which the tray is movable between the open position and the closed position.

11. The battery charger of claim 10, further comprising a locking member movable relative to the housing between the locked position and the unlocked position.

12. The battery charger of claim 10, wherein the tray has arcuate side walls defining a generally cylindrical receptacle.

13. The battery charger of claim 10, wherein the interface includes a grip portion.

14. The battery charger of claim 10, further comprising a stop coupled to one of the tray and the housing and engageable with the other of the tray and the housing to limit movement of the tray from the cavity and through the opening.

15. The battery charger of claim 10, wherein the housing includes a first housing portion and a second housing portion coupled together to define the cavity.

16. A method of charging a battery pack, the method comprising:
   opening a receptacle defined by a tray;
   inserting the battery pack into the receptacle;
   moving the tray into a housing to close the receptacle;
   after moving, pivoting a locking member, via a user interface, relative to the housing from an unlocked position to a locked position to lock the tray in a closed position; and
   providing, at a power inlet on an end opposite the receptacle, a charging current; and
   charging, via a charging terminal supported on the tray, the battery pack with the charging current,
   wherein the charging terminal is configured to electrically connect with a terminal of the battery pack.

* * * * *